US00RE47079E

(19) United States
(12) Reissued Patent
Seidel et al.

(10) Patent Number: US RE47,079 E
(45) Date of Reissued Patent: Oct. 9, 2018

(54) PROCESS FOR IMPROVING CARBON BLACK DISPERSION

(71) Applicant: Covestro Deutschland AG, Leverkusen (DE)

(72) Inventors: Andreas Seidel, Dormagen (DE); Hans-Jurgen Thiem, Dormagen (DE); Reiner Rudolf, Langenfeld (DE); Joerg Reichenauer, Krefeld (DE); Thomas Eckel, Dormagen (DE)

(73) Assignee: COVESTRO DEUTSCHLAND AG, Leverkusen (DE)

(21) Appl. No.: 15/625,433

(22) Filed: Jun. 16, 2017

Related U.S. Patent Documents

Reissue of:
(64) Patent No.: 9,056,957
Issued: Jun. 16, 2015
Appl. No.: 13/332,047
Filed: Dec. 20, 2011

(30) Foreign Application Priority Data

Dec. 23, 2010 (EP) ..... 10196932

(51) Int. Cl.

| | |
|---|---|
| ***C08K 5/10*** | (2006.01) |
| ***C09D 201/00*** | (2006.01) |
| ***C09C 1/44*** | (2006.01) |
| ***C09B 67/00*** | (2006.01) |
| ***C08J 3/22*** | (2006.01) |
| ***C08G 64/16*** | (2006.01) |
| ***C08L 91/06*** | (2006.01) |

(52) U.S. Cl.
CPC ..... *C08J 3/226* (2013.01); *C08J 2491/06* (2013.01); *C08L 91/06* (2013.01)

(58) Field of Classification Search
CPC ..... C08K 5/10; C08J 3/226; C08J 2491/06; C08L 91/06
See application file for complete search history.

(56) References Cited

U.S. PATENT DOCUMENTS

| | | | |
|---|---|---|---|
| 3,353,974 | A | 11/1967 | Stanley et al. |
| 3,778,288 | A | 12/1973 | Ridge et al. |
| 4,230,501 | A | 10/1980 | Howard et al. |
| 4,310,483 | A | 1/1982 | Dorfel et al. |
| 4,484,952 | A | 11/1984 | Bes et al. |
| 5,219,903 | A | 6/1993 | Fujii et al. |
| 2006/0084000 | A1 | 4/2006 | Tsunemi et al. |
| 2009/0057621 | A1 | 3/2009 | Keulen et al. |

FOREIGN PATENT DOCUMENTS

| | | |
|---|---|---|
| EP | 0 578 245 | 12/1994 |
| EP | 0578245 | 12/1994 |
| WO | 02/092702 | 11/2002 |
| WO | WO 2002/092702 | 11/2002 |
| WO | WO 2010/051940 | 5/2010 |
| WO | WO 2010/051940 A1 * | 5/2010 |

OTHER PUBLICATIONS

International Search Report and Written Opinion for International Application No. PCT/EP2011/073295, European Patent Office, dated Feb. 22, 2012.
Giles, et al., Extrusion: The Definitive Processing Guide and Handbook, PDL Handbook Series, 2005, pp. 1, 425-430, William Andrew Publishing/Plastics.
Giles Extrusion: The Definitive Processesing Guide and Handbook, 2005, William Andrew Publishing/Plastics Design Library., pp. 1, 425-430.*
International Search Report of PCT/EP2011/073295 Mailed Feb. 22, 2012 (13 pages).

* cited by examiner

*Primary Examiner* — Elizabeth McKane
(74) *Attorney, Agent, or Firm* — K&L Gates LLP

(57) ABSTRACT

A masterbatch comprising pigment and demolding agent is provided. The demolding agent is selected from the group comprising low molecular weight polyolefin oils, low molecular weight polyolefin waxes, montan waxes and aliphatic or aromatic carboxylic acid esters of fatty acids and/or fatty alcohols, wherein the pigment content of the masterbatch is from 3 to 70 wt. %, based on the total weight of the masterbatch. The masterbatch is suitable for preparation of a polymer composition having improved pigment dispersion.

13 Claims, 12 Drawing Sheets

PROCESS FOR IMPROVING CARBON BLACK DISPERSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This [application] *Application is a reissue of U.S. application Ser. No. 13/332,047, filed on Dec. 20, 2011, issued as U.S. Pat. No. 9,056,957, which* claims priority to European Patent Application No. 10196932.7, filed Dec. 23, 2010, the content of *each of* which is incorporated herein by reference in its entirety.

BACKGROUND

1. Field of the Invention

The invention provides pigment-containing polycarbonate compounds having improved dispersion of the pigment particles in the polymer matrix, and a process for the preparation of these compounds. Carbon black is preferably used as the pigment, "carbon black" in the present invention representing all particulate pure carbon substrates and carbon compounds, for example colour carbon blacks, conductivity carbon blacks, carbon nanotubes, graphite. The pigment-containing polycarbonate compounds can contain further polymers, such as, for example, elastomers or graft polymers, or further thermoplastics, such as, for example, polyesters.

The present invention relates further to the use of pigment masterbatches containing the pigment and a demoulding agent which is to be added to the polycarbonate composition.

The present invention relates further to a process for the preparation of such polycarbonate compounds having improved dispersion of the pigment particles in the polymer matrix, in which, in the compounding of the polycarbonate composition, a masterbatch of the pigment in fatty acid esters based on aliphatic alcohols or polyols is used. The invention further provides the preparation of such pigment masterbatches in fatty acid esters.

2. Description of Related Art

A technical problem when incorporating pigments, and carbon black particles in particular, into thermoplastic polymer compositions is that of dispersing the pigment particles completely and uniformly in the polymer matrix. Incompletely dispersed pigment particles form pigment agglomerates which apart from colour inhomogeneities and inadequate depth of colour also result in particular in defects which have an adverse effect on the mechanical properties of the polymer compositions, such as their strength and ultimate elongation, and also on the surface properties of the materials. Larger pigment agglomerates lead, for example, to faults and defects on the surface of such compositions such as pitting, streakiness and, ultimately, to an undesirable reduction in the degree of gloss. In a composite with other materials, such surface defects can additionally also adversely affect the composite adhesion properties (for example lacquer adhesion).

Carbon-based pigments—such as, for example, carbon blacks, graphites, fullerenes, graphenes, activated charcoals and carbon nanotubes, which are used in many commercial fields of application, for example for black colouration, for increasing the electrical or thermal conductivity of the composition, for mechanical strengthening or also for binding and reducing the volatility of low molecular weight organic compounds such as residual monomers or odour-bearing substances are distinguished by particularly strong interparticle binding forces and therefore have a particularly high tendency to form agglomerates, which can be broken up again only with difficulty on incorporation into thermoplastic polymers.

Various methods are known from the prior art for improving the dispersion of such pigments in thermoplastic polymer compositions. For example, pigment dispersion can be improved by increasing the specific energy input by means of shear during the incorporation of the pigments into the polymer melt in conventional compounding units such as twin-screw extruders or internal kneaders.

However, the energy input which can be used for pigment dispersion is technically limited in the case of polymer melts, in particular those having a low viscosity, that is to say high melt flowability, as is required for good thermoplastic processability in most fields of application. In other cases, the energy input is limited by the thermal loading capacity of the polymer melt into which the pigment is to be incorporated. High specific energy inputs naturally lead to high process temperatures which, depending on the polymer, can lead to undesirable damage, ageing or even decomposition of the polymer.

A further method is the use of a highly concentrated masterbatch of the pigment in a polymer matrix, but the technically achievable concentration of the pigment in the polymer matrix is not high enough for an economic application without the use of further additives/processing aids. Furthermore, good pigment dispersion in the end product can be achieved with this method only if the pigments are already well dispersed in the masterbatch, which is only insufficiently ensured when using polymer matrices, in particular in polycarbonate.

A further possibility for improving the dispersion of pigments consists in using dispersing aids, which reduce the intermolecular interactions between the individual pigment particles or pigment aggregates within a pigment agglomerate and thereby facilitate the breaking up of the agglomerates during the preparation of the compounds. The disadvantage of the use of such dispersing aids, which have no other necessary action in the composition, is that they remain in the polymer composition that is produced and, as a result, may possibly adversely affect the application-related properties of the target products.

For example, such dispersing aids in multiphase compositions (blends) of different polymers (such as, for example, impact-modified polymers) can adversely affect the phase compatibility of the different polymer components by accumulating at the phase boundaries and thereby adversely affect the mechanical properties of the blend composition. Likewise, these additives can catalyse undesirable ageing processes in certain polymer systems, for example hydrolytic decomposition reactions in polycondensation polymers.

The preparation of pigment concentrates in wax-like compounds is already known from U.S. Pat. No. 4,484,952, wherein the preparation of carbon black concentrates in PETS (pentaerythritol tetrastearate) is also described. However, the shear forces which occur under the stirring, spraying or centrifugation conditions mentioned in U.S. Pat. No. 4,484,952 for mixing the pigments with the carrier are too small to achieve sufficiently fine separation and uniform distribution of the pigments in the carrier material in the case of highly agglomerated pigments. However, this is a necessary requirement for subsequent uniform dispersion of the pigments in a polymer matrix with the aid of such pigment concentrates. Moreover, U.S. Pat. No. 4,484,952 gives no indication of the quality of the pigment dispersion which can be achieved in thermoplastics with carbon black concentrates so prepared, in particular the dispersion of the carbon black which can be achieved in polycarbonate compositions. Furthermore, there is no information in U.S. Pat. No. 4,484,952 regarding the process parameters used in the preparation of the pigment concentrates and the energy input as well as the mixing unit used, which have a critical influence on the quality of the dispersion.

The preparation of pigment and, in particular, carbon black concentrates in wax-like compounds is also known from U.S. Pat. No. 4,310,483. However, this is likewise a concentrate form in which only a low energy input for the separation of agglomerated pigments and their uniform distribution in the matrix material occurs. The preparation process is in fact aimed at improving the metering properties of the described pigment concentrates, dust formation being largely avoided and a more advantageous metering form being achieved by wetting of the pigments. The amount of pigment in the described carbon black concentrates far exceeds the amount of granulating aid used. Regarding the quality of the pigment dispersion in thermoplastics using such pigment concentrates, it is stated in U.S. Pat. No. 4,310,483 that it is equally as good as in the case of the metering of pure powder without the use of granulating aids, but an improvement in the dispersion is not described.

WO 2002/092702 relates to the coating of carbon black pellets by spraying with wax-like compounds, accordingly, for example, also with PETS, in order to improve the metering properties of carbon black products by the coating.

The preparation of carbon black-containing polycarbonate moulding compositions using carbon black masterbatches is described in EP 578 245 A2. However, the masterbatches here are masterbatches in polyethylenes. Polyethylenes lead to disadvantageous property changes in polycarbonate moulding compositions, for example in respect of the low-temperature strength of the moulding compositions, and are therefore to be avoided.

US 2009/0057621 A1 describes the melt-mixing of carbon-containing thermoplastic masterbatches with thermoplastics without isolation of the masterbatch but with simultaneous continuous metering into a second thermoplastic melt, wherein the thermoplastic can also be polycarbonate. Such a process is technically too complex and inflexible, however.

SUMMARY

In order to overcome disadvantages associated with the above-mentioned art, it was, therefore, an object of the present invention to provide a novel process for improved dispersion of pigments, in particular carbon black, in polycarbonate compounds.

In addition, when using pigment concentrates, no foreign substances that do not have a necessary action in the composition are to be introduced into the polycarbonate compounds.

Furthermore, a pigment concentrate in isolated form is to be provided, which concentrate is suitable for incorporation into and for the preparation of polycarbonate compounds having improved pigment dispersion.

It was a further object of the invention, by the use of a pigment concentrate, to achieve better dispersion of pigments in a polymer matrix than is possible by metering the pure pigment in powder form in a single compounding step, it still being possible to carry out the preparation process under standard conditions in conventional mixing units such as, for example, in single- or multi-shaft extruders, kneaders or internal mixers.

Surprisingly, it has been found that pigments, in particular carbon blacks, in substances which are used as demoulding agents for polycarbonate moulding compositions, in a preferred embodiment in aliphatic fatty acid esters, can, under defined conditions, be both homogenously distributed and very well dispersed in the melt of the fatty acid esters using mechanical shear, and that a carbon black concentrate so prepared, after cooling, can be formed into pellets and used in a subsequent compounding process as a masterbatch for colouring thermoplastic compositions, in particular also for colouring polycarbonate compositions. In principle, various types of demoulding agents and various, in particular carbon-containing, pigments are suitable for the preparation of such masterbatches.

DETAILED DESCRIPTION OF A PREFERRED EMBODIMENT

Figure 1:
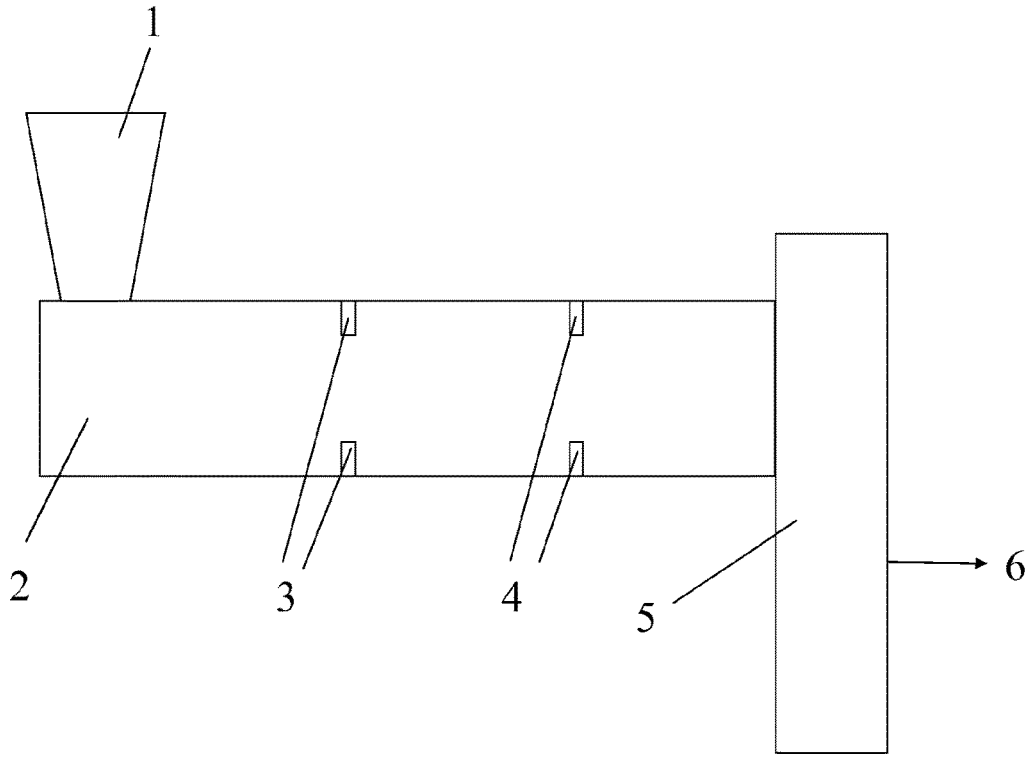
FIG. 1 shows a structure of a co-kneader.

Objects of the present invention can be achieved, for example, by the compositions, the process and the use as disclosed hereinbelow and described in the claims, the preferred embodiments according to the invention generally being described hereinbelow with carbon black as the preferred pigment by way of example, but this does not imply any fundamental limitation to carbon black as the pigment.

Concentrates of suitable carbon black types in demoulding agents containing fatty acid esters were prepared, which concentrates can preferably be granulated at room temperature. The demoulding agent that is preferably used for the preparation of such carbon black masterbatches is pentaerythritol tetrastearate (PETS). However, other fatty acid esters, preferably those which are solid at room temperature (20° C.), can likewise be used for the preparation of carbon black masterbatches according to the invention. The carbon black masterbatches according to the invention can be prepared in conventional compounding units in the melt of the fatty acid esters with the application of sufficiently high shear energy for the adequate separation of any agglomerated carbon black particles.

It has further been found that polycarbonate moulding compositions which have been prepared and coloured using the carbon black masterbatches according to the invention by compounding in a single compounding step in conventional mixing units such as, for example, single- or multi-shaft extruders, kneaders or internal mixers under standard conditions, exhibit substantially improved dispersion of the carbon black particles in the polycarbonate matrix after thermoplastic processing to moulded articles. The polycarbonate moulding compositions can contain further thermoplastics or particulate elastomeric polymers, as well as conventional fillers and polymer additives.

Accordingly, the invention provides, in particular, a process for the preparation of carbon black-containing polycarbonate moulding compositions, wherein the carbon black is present in finely dispersed form in the form of a masterbatch in a substance which is used as demoulding agent in the formulation of the polycarbonate moulding compositions and accordingly exhibits a necessary action in the composition, and is introduced into the polycarbonate moulding composition by melt compounding. The carbon black masterbatch is preferably in the form of a pellet, as described above, and is used and metered as such in the compounding process. As an alternative, however, such a carbon black masterbatch, because of the low melt viscosity at the relatively low melting points, can also be fed into the compounding unit in liquid or pasty form with the aid of melt metering pumps.

Suitable mixing units for the preparation of the carbon black masterbatch are single- or multi-shaft extruders or kneaders, such as, for example, Buss co-kneaders or internal mixers or shear rollers, and any mixing units with which a sufficiently high shear energy can be introduced into the melt of carbon black and demoulding agent in order to finely separate any solid carbon black agglomerates and distribute them uniformly in the demoulding agent.

The starting components carbon black and demoulding agent are fed to the compounding unit either separately or in the form of a powder or grain or granule mixture and are intimately mixed in the melt at a heating temperature of the housing of from 25° C. to 200° C., preferably from 30° C. to 130° C.

The masterbatches so obtained, depending on their carbon black content and the demoulding agent used, preferably have a solid consistency at room temperature. For metering in the form of a solid, the carbon black masterbatches are formed into melt strands, optionally filtered in the melt through a fine-mesh sieve (10-100 μm mesh size, preferably 20-50 μm) in order to retain incompletely separated carbon black agglomerates, and then cooled to temperatures below 40° C., preferably below 30° C., and subsequently granulated.

Suitable granulating devices for the preparation of sufficiently finely divided granules/pellets of the carbon black masterbatch which can readily be metered in the subsequent compounding of the polycarbonate moulding compositions are underwater or hot-face water-ring granulators. The granules or pellets so obtained have a maximum length of preferably 8 mm, particularly preferably not more than 5 mm, and a minimum length of preferably 0.5 mm, particularly preferably not less than 1 mm, the length defining the axis in the direction of the greatest extent of a body.

In an alternative embodiment, the masterbatch is used in the form of a powder having a maximum diameter smaller than 0.5 mm and not less than 0.1 mm.

The amount of carbon black or pigment in the masterbatch can vary within relatively wide limits from 3 wt. % to 70 wt. %, based on the masterbatch; the carbon black content is preferably from wt. % to 70 wt. %, more preferably from 35 wt. % to 65 wt. %, particularly preferably from 40 to 60 wt. %.

The nature of the pigment used and in particular also of the carbon black used can vary very greatly, the term "carbon black" also including chemical species such as carbon nanotubes, graphite, conductivity carbon black and colour carbon black, as well as carbon blacks obtained by very different production processes. Colour carbon blacks and conductivity carbon blacks are particularly preferred, and colour carbon blacks are most particularly preferred. These carbon blacks can optionally also be used together with other organic or inorganic pigments either in the carbon black masterbatch or in the compounding of the polycarbonate moulding composition. Carbon nanotubes (CNTs) are preferably not used in an alternative embodiment.

The nature of the demoulding agent used can likewise vary greatly, there preferably being used compounds such as low molecular weight polyolefin oils or waxes, hydrogenated oils, montanic acid or fatty acid esters, which preferably have a solid consistency at room temperature. Further preferred demoulding agents are aliphatic montanic or fatty acid esters, such as, for example, glycerol stearates or palmitates or pentaerythritol stearates. Pentaerythritol tetrastearate (PETS) is particularly preferred.

These carbon black masterbatches prepared according to the invention are intimately mixed with polymers, preferably with polycarbonate and optionally further components of the polymer, preferably polycarbonate, moulding composition in conventional melt-mixing units, such as, for example, in single- or multi-shaft extruders or in kneaders, in the melt under conventional conditions, and the mixture is extruded and granulated. They can be metered at a suitable location into the solids feed region of the extruder or into the polymer melt, either separately in the form of granules or pellets via proportioning weighers or lateral feed devices or alternatively at elevated temperature in the form of a melt by means of metering pumps. The masterbatches in the form of granules or pellets can also be combined with other particulate compounds to give a premixture and then fed together into the solids feed region of the extruder or into the polymer melt in the extruder via metering hoppers or lateral feed devices. The compounding unit is preferably a twin-shaft extruder, particularly preferably a twin-shaft extruder having co-rotating shafts, the twin-shaft extruder having a length/diameter ratio of the screw shaft of preferably from 20 to 44, particularly preferably from 28 to 40. Such a twin-shaft extruder comprises a melting and mixing zone or a combined melting and mixing zone (this "melting and mixing zone" is also referred to hereinbelow as the "kneading and melting zone") and optionally a degassing zone in which an absolute pressure $p_{abs}$ of preferably not more than 800 mbar, more preferably not more than 500 mbar, particularly preferably not more than 200 mbar, is set. The mean residence time of the mixture composition in the extruder is preferably limited to not more than 120 s, particularly preferably not more than 80 s, particularly preferably not more than 60 s. In a preferred embodiment, the temperature of the melt of the polymer or of the polymer alloy at the extruder outlet is from 200° C. to 400° C.

The invention accordingly also provides pigment-containing polymer moulding compositions, in a preferred embodiment polycarbonate moulding compositions, having improved pigment dispersion, which moulding compositions are prepared by the process according to the invention, that is to say using a pigment-demoulding agent concentrate according to the invention containing a) from 1 to 99.96 wt. %, preferably from 40 to 99.9 wt. %, more preferably from 50 to 99.8 wt. %, particularly preferably from 50 to 75 wt. %, of at least one thermoplastic polymer (a),
b) from 0.02 to 10 wt. %, preferably from 0.05 to 5 wt. %, more preferably from 0.1 to 3 wt. %, particularly preferably from 0.1 to 1.5 wt. %, of at least one pigment component (b), in a preferred embodiment of a carbon-based pigment, in a particularly preferred embodiment carbon black,
c) from 0.02 to 10 wt. %, preferably from 0.05 to 5 wt. %, more preferably from 0.1 to 3 wt. %, particularly preferably from 0.1 to 1.5 wt. %, of at least one demoulding agent (c),
d) from 0 to 70 wt. %, preferably from 0 to 60 wt. %, more preferably from 2 to 60 wt. %, particularly preferably from 20 to 60 wt. %, of one or more thermoplastic polyesters (d),
e) from 0 to 50 wt. %, preferably from 0 to 40 wt. %, more preferably from 1 to 30 wt. %, particularly preferably from 2 to 20 wt. %, of one or more elastomers (e) other than component
f) from 0 to 70 wt. %, preferably from 0 to 60 wt. %, more preferably from 1 to 50 wt. %, particularly preferably from 3 to 40 wt. %, of one or more optionally rubber-modified vinyl (co)polymers (f), and
g) from 0 to 40 wt. %, preferably from 0 to 30 wt. %, more preferably from 0.1 to 20 wt. %, particularly preferably from 0.2 to 10 wt. %, of further additives.

Components b and c can be used in the preparation of the pigment-containing polymer moulding compositions according to the invention either wholly or only partially in the form of a masterbatch of components b and c. In a preferred embodiment, carbon-based pigments according to component b are used in the preparation of the pigment-containing polymer moulding compositions according to the invention solely in the form of a masterbatch of components b and c, it being possible, however, for a portion of component c in this preferred embodiment also to be used in the form of the pure component in the preparation of the pigment-containing polymer moulding compositions according to the invention. In a particularly preferred embodiment, components b and c are used in the preparation of the pigment-containing polymer moulding compositions according to the invention solely in the form of a masterbatch of components b and c.

Moulded articles which have been produced by thermoplastic processing, for example by injection moulding, from these pigment/carbon black-containing polymer/polycarbonate moulding compositions prepared according to the invention exhibit a markedly more homogeneous moulding surface with markedly fewer optical imperfections, that is to say surface defects, and markedly improved strength, in particular improved notched impact strength, as compared with polymer/polycarbonate moulding compositions of the same composition which have been prepared by direct compounding, for example from powder mixtures or by compounding using thermoplastic-based pigment/carbon black masterbatches.

In a preferred embodiment, the number of surface defects (pitting, craters, pinholes, etc.) on moulded articles produced by the injection moulding process from the polymer/polycarbonate compositions according to the invention is reduced by at least 20%, particularly preferably by 20 to 95 percent, as compared with moulded articles of the moulding compositions having the same composition which have been prepared by a different process, in particular by a one-step compounding process using pigment component b in powder form.

The surface defects of injection-moulded articles produced on injection moulding tools with a high-gloss finish (ISO N1) can be identified and quantified by optical analysis methods, all imperfections having a mean diameter of at least 10 min being used in determining the number of surface defects. The number of surface defects was determined by observing the moulding surfaces under a reflected light microscope—e.g. Zeiss Axioplan 2 motorised—through an object lens with 2.5× magnification in a bright field, with illumination by means of a halogen 100 light source. The number of defects in a surface region measuring 4 cm×4 cm was determined by scanning the area in a meandering manner. The determination was assisted by a camera—e.g. Axiocam IRC—with image evaluation software—e.g. KS 300 Zeiss.

According to analysis by Raman spectroscopy, the surface defects thus determined optically on mouldings of polymer/polycarbonate moulding compositions having the above-mentioned compositions represent agglomerates and aggregates of pigments, in particular carbon black particles, optionally together with elastomer particles of components E and/or F, which are inadequately separated in the melt compounding of the components in the extruder. Such surface defects are clearly visible by reflected light microscopy of suitable sections of the material samples. Such surface defects usually have mean diameters of from about 10 μm to about 300 μm.

In the preparation according to the invention of the pigment/carbon black-containing polymer/polycarbonate moulding compositions, further process-related measures can be taken which further assist in improving the dispersion of the pigment/carbon black in the polymer matrix. For example, during the compounding of the pigment/carbon black-containing polymer/polycarbonate moulding compositions in the melt, water can be added in amounts of from 0.2 to 10 wt. %, based on the moulding composition, and removed again via a degassing nozzle of the extruder, as described in DE 10 2009 009680 and EP 10001490.1. Likewise, compounding of the pigment/carbon black-containing polymer/polycarbonate moulding compositions can be carried out on extruders having enlarged gap widths between the screw crest and the housing wall, as described in EP 1016954.7. All these measures bring about improvements in the dispersion of the pigment/carbon black in the polymer/polycarbonate moulding compositions both on their own and in combination with one another.

Component a

There can be used as thermoplastic polymers a in the compositions according to the invention, for example, polyolefins (such as polyethylene and polypropylene), vinyl (co)polymers such as polyvinyl chloride, styrene (co)polymers (e.g. styrene-acrylonitrile copolymers, acrylonitrile-butadiene-styrene copolymers, polyacrylates, polyacrylonitrile), polyvinyl acetate, thermoplastic polyurethanes, polyacetals (such as polyoxymethylene and polyphenylene ether), polyamides, polyimides, polycarbonates, polyesters, polyester carbonates, polysulfones, polyarylates, polyaryl ethers, polyphenylene ethers, polyarylsulfones, polyaryl sulfides, polyether sulfones, polyphenylene sulfide, polyether ketones, polyamide imides, polyether imides and polyester imides.

In a preferred embodiment there is used as the thermoplastic polymer a in the compositions according to the invention at least one representative selected from the group of the aromatic polycarbonates and aromatic polyester carbonates.

Aromatic polycarbonates and/or aromatic polyester carbonates according to component a that are suitable according to the invention are known in the literature or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, BE-A 2 703 376, DE-A 2 714 544, DE-A 3 000 610, DE-A 3 832 396; for the preparation of aromatic polyester carbonates see e.g. BE-A 3 007 934). The preparation of aromatic polycarbonates is carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is also possible.

Diphenols for the preparation of the aromatic polycarbonates and/or aromatic polyester carbonates are preferably those of formula (I)

(I)

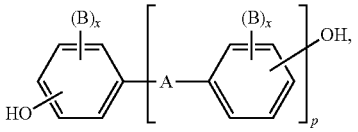

wherein

A is a single bond, $C_1$- to $C_5$-alkylene, $C_2$- to $C_5$-alkylidene, $C_5$- to $C_6$-cycloalkylidene, —O—, —SO—, —CO—, —S—, —$SO_2$—, $C_6$- to $C_{12}$-arylene, to which further aromatic rings optionally containing heteroatoms can be fused, or a radical of formula (II) or (III)

(II)

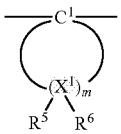

(III)

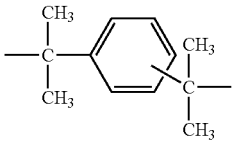

B is in each case $C_1$- to $C_{12}$-alkyl, preferably methyl, halogen, preferably chlorine and/or bromine, x each independently of the other is 0, 1 or 2, p is 1 or 0, and $R^5$ and $R^6$ can be chosen individually for each $X^1$ and each independently of the other is hydrogen or $C_1$- to $C_6$-alkyl, preferably hydrogen, methyl or ethyl, $X^1$ is carbon and m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxy-phenyl) sulfoxides, bis-(hydroxyphenyl) ketones, bis-(hydroxyphenyl)-sulfones and α,α-bis-(hydroxyphenyl)-diisopropyl-benzenes, and derivatives thereof brominated and/or chlorinated on the ring.

Particularly preferred diphenols are 4,4'-dihydroxydiphenyl, bisphenol A, 2,4-bis(4-hydroxy-phenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenylsulfone and di- and tetra-brominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be used on their own or in the form of arbitrary mixtures. The diphenols are known in the literature or are obtainable according to processes known in the literature.

Chain terminators suitable for the preparation of thermoplastic aromatic polycarbonates are, for example, phenol, p-chlorophenol, p-tert-butylphenol or 2,4,6-tribromophenol, but also long-chained alkylphenols, such as 4-[2-(2,4,4-trimethylpentyl]-phenol, 4-(1,3-tetramethylbutyl)-phenol according to DE-A 2 842 005 or monoalkylphenol or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates have mean weight-average molecular weights ($M_w$, measured by GPC (gel permeation chromatography with polycarbonate standard in dichloromethane) of from 10,000 to 200,000 g/mol, preferably from 15,000 to 80,000 g/mol, particularly preferably from 24,000 to 32,000 g/mol.

The thermoplastic aromatic polycarbonates can be branched in a known manner, preferably by the incorporation of from 0.05 to 2.0 mol %, based on the sum of the diphenols used, of compounds having a functionality of three or more than three, for example those having three or more phenolic groups. Preference is given to linear polycarbonates, more preferably based on bisphenol A.

Both homopolycarbonates and copolycarbonates are suitable. For the preparation of copolycarbonates of component a according to the invention it is also possible to use from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared according to processes known in the literature. Polydiorganosiloxane-containing copolycarbonates are likewise suitable; the preparation of copolycarbonates containing polydiorganosiloxanes is described, for example, in DE-A 3 334 782.

Preferred polycarbonates in addition to the bisphenol A homopolycarbonates are the copolycarbonates of bisphenol A with up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of from 1:20 to 20:1 are particularly preferred.

In the preparation of polyester carbonates, a carbonic acid halide, preferably phosgene, is additionally used concomitantly as bifunctional acid derivative.

Suitable chain terminators for the preparation of the aromatic polyester carbonates, in addition to the monophenols already mentioned, are also the chlorocarbonic acid esters thereof and the acid chlorides of aromatic monocarboxylic acids, which can optionally be substituted by $C_1$- to $C_{22}$-alkyl groups or by halogen atoms, as well as aliphatic $C_2$- to $C_{22}$-monocarboxylic acid chlorides.

The amount of chain terminators is in each case from 0.1 to 10 mol %, based in the case of phenolic chain terminators on moles of diphenol and in the case of monocarboxylic acid chloride chain terminators on moles of dicarboxylic acid dichloride.

In the preparation of aromatic polyester carbonates, one or more aromatic hydroxycarboxylic acids can additionally be used.

The aromatic polyester carbonates can be both linear and branched in known manner (see in this connection DE-A 2 940 024 and DE-A 3 007 934), linear polyester carbonates being preferred.

There can be used as branching agents, for example, carboxylic acid chlorides, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenylisopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be placed in a vessel with the diphenols; acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or distributed randomly.

The thermoplastic aromatic polycarbonates and polyester carbonates can be used on their own or in an arbitrary mixture.

Components a which are particularly preferably used according to the invention are polycarbonates, with bisphenol A homopolycarbonates being particularly preferred.

Component b

There are used as component b in principle any desired inorganic or organic, natural or synthetically prepared pigments. A pigment is understood as being a colour-giving substance which is insoluble in the application medium (here the thermoplastic polymer according to component a). Examples of such pigments are titanium dioxide, carbon black, bismuth pigments, metal oxides, metal hydroxides, metal sulfides, iron cyan blue, ultramarine, cadmium pigments, chromate pigments, azo pigments as well as polycyclic pigments.

There are preferably used as component b those pigments which have strong interparticle binding forces (van der Waals forces), because these are particularly difficult to disperse.

Component b is particularly preferably at least one carbon-based pigment selected from the group consisting of carbon black, graphite, fullerene, graphene, activated charcoal and carbon nanotubes (CNTs).

There are suitable as carbon nanotubes both those having a single-layer wall (single-walled carbon nanotubes=SWCNTs) and those having a multi-layer wall (multi-walled carbon nanotubes=MWCNTs).

Carbon nanotubes (CNTs) are preferably understood as being cylindrical carbon tubes having a carbon content of >95%, which tubes do not contain any amorphous carbon. The carbon nanotubes preferably have an outside diameter of from 3 to 80 nm, particularly preferably from 5 to 20 nm. The mean value of the outside diameter is preferably from 13 to 16 nm. The length of the cylindrical carbon nanotubes is preferably from 0.1 to 20 μm, particularly preferably from 1 to 10 μm. The carbon nanotubes preferably consist of from 2 to 50, particularly preferably from 3 to 15, graphitic layers (also referred to as "walls"), which have a smallest inside diameter of from 2 to 6 nm. These carbon nanotubes are also referred to as "carbon fibrils" or "hollow carbon fibres", for example.

The production of the CNTs used according to the invention is generally known (see e.g. U.S. Pat. No. 5,643,502 and DE-A 10 2006 017 695); they are preferably produced by the process disclosed in DE-A 10 2006 017 695, particularly preferably by the process disclosed in Example 3 of DE-A 10 2006 017 695.

In an alternative embodiment, carbon-based pigments according to component b are preferably not used in the form of carbon nanotubes, but carbon-based pigments with the exception of CNTs, preferably carbon black, particularly preferably colour carbon black, are employed as component b.

Carbon black is a black pulverulent solid which, depending on the quality and use, consists substantially of carbon. The carbon content of carbon black is generally from 80.0 to 99.9 wt. %. In the case of carbon blacks which have not been subjected to oxidative after-treatment, the carbon content is preferably from 96.0 to 95.5 wt. %. By extraction of the carbon black with organic solvents, for example with toluene, traces of organic impurities on the carbon black can be removed and the carbon content can thereby be increased to more than 99.9 wt. %. In the case of carbon blacks which have undergone oxidative after-treatment, the oxygen content can be up to 30 wt. %, preferably up to wt. %, in particular from 5 to 15 wt. %.

Carbon black consists of mostly spherical primary particles having a size of preferably from 10 to 500 nm. These primary particles have grown together to form chain-like or branched aggregates. The aggregates are generally the smallest unit of the carbon black which can be separated in a dispersing process. Many of these aggregates in turn combine by intermolecular (van der Waals) forces to form agglomerates. By varying the production conditions, both the size of the primary particles and the aggregation (structure) thereof can purposively be adjusted. The person skilled in the art understands structure as being the type of three-dimensional arrangement of the primary particles in an aggregate. A "high structure" refers to carbon blacks with highly branched and crosslinked aggregate structures; in the case of largely linear aggregate structures, that is to say aggregate structures with little branching and crosslinking, on the other hand, the term "low structure" is used.

The oil adsorption number measured according to ISO 4656 with dibutyl phthalate (DBP) is generally given as a measure of the structure of a carbon black. A high oil absorption number is indicative of a high structure.

The primary particle size of a carbon black can be determined, for example, by means of scanning electron microscopy. However, the BET surface area of the carbon black, determined according to ISO 4652 with nitrogen adsorption, is also used as a measure of the primary particle size of a carbon black. A high BET surface area is indicative of a small primary particle size.

The dispersibility of the agglomerates of a carbon black depends on the primary particle size and the structure of the aggregates, the dispersibility of the carbon black generally decreasing as the primary particle size and the structure decrease.

As a commercial product, industrial carbon black is produced by incomplete combustion or pyrolysis of hydrocarbons. Processes for the production of industrial carbon black are known in the literature. Known processes for the production of industrial carbon blacks are in particular the furnace, gas black, flame black, acetylene black and thermal black processes.

The particle size distribution of the primary particles and the size and structure of the primary particle aggregates determine the properties such as depth of colour, ground shade and conductivity of the carbon black. Conductive carbon blacks generally have small primary particles and highly branched aggregates. Colour carbon blacks are generally carbon blacks with very small primary particles and are often subjected to subsequent oxidation after production by one of the above-mentioned processes. The oxidic groups thereby attached to the carbon black surface are intended to increase the compatibility with the resins into which the carbon blacks are to be introduced and dispersed.

Colour carbon blacks are preferably used as component b. In a preferred embodiment they have a mean primary particle size, determined by scanning electron microscopy, of from 10 to 100 nm, more preferably from 10 to 50 nm, particularly preferably from 10 to 30 nm, in particular from 10 to 20 nm. The particularly finely divided colour carbon blacks are therefore particularly preferred in the process according to the invention because the depth of colour and UV resistance which can be achieved with a particular amount of carbon black increases as the primary particle size decreases but, on the other hand, their dispersibility also decreases, for which reason such very finely divided carbon blacks in particular are in need of improvement in respect of their dispersibility.

The colour carbon blacks which are preferably used as component b have a BET surface area, determined according to ISO 4652 by nitrogen adsorption, of preferably at least 20 $m^2/g$, more preferably of at least 50 $m^2/g$, particularly preferably of at least 100 $m^2/g$, in particular of at least 150 $m^2/g$.

Colour carbon blacks which are preferably used as component b are additionally characterised by an oil adsorption number, measured according to ISO 4656 with dibutyl phthalate (DBP), of preferably from 10 to 200 ml/100 g, more preferably from 30 to 150 ml/100 g, particularly preferably from 40 to 120 ml/100 g, in particular from 40 to 80 ml/100 g. The colour carbon blacks with a low oil adsorption number generally achieve a better depth of colour and are preferred in that regard but, on the other hand, they are generally more difficult to disperse, for which reason such carbon blacks in particular are in need of improvement in respect of their dispersibility.

The carbon blacks which are used as component b can and are preferably used in pellet or pearl form. Pearl formation or pelletisation is carried out by processes known in the literature and serves on the one hand to increase the bulk density and improve the metering (flow) properties but, on the other hand, is also carried out for occupational health reasons. The pellets or pearls are preferably so adjusted in terms of their hardness that they withstand transport and feeding processes during metering largely undamaged but break up into agglomerates again completely under the action of high mechanical shear forces as occur, for example, in conventional powder mixing devices and/or compounding units.

Component c

Demoulding agents which can be used according to the invention are compounds having softening temperatures of preferably below 120° C., particularly preferably from 20° C. to 100° C., most particularly preferably from 40° C. to 80° C., such as, for example, low molecular weight polyolefin oils or waxes, montan waxes, aliphatic or aromatic carboxylic acid esters based on fatty acids and/or fatty alcohols. Demoulding agents which are preferred according to the invention are aliphatic carboxylic acid esters. These are esters of aliphatic long-chained carboxylic acids with mono- or di-valent aliphatic and/or aromatic, preferably aliphatic, hydroxy compounds.

Aliphatic carboxylic acid esters which are particularly preferably used are or contain compounds of the general formula (IV):

$$(R_2\text{—CO—O})_o\text{—}R_3\text{—}(OH)_p \text{ where } o=1 \text{ to } 4 \text{ and } p=0 \text{ to } 3 \qquad \text{(IV)},$$

wherein $R_2$ is an aliphatic saturated or unsaturated, linear, cyclic or branched alkyl radical and $R_3$ is an alkylene radical of a mono- to tetra-hydric aliphatic alcohol of the formula $R_3\text{—}(OH)_{o+p}$. In the compounds of formula (IV), the o radicals $R_2$ in the same molecule can also have different structures.

Particularly preferred for $R_2$ are $C_1$-$C_{30}$-, particularly preferably $C_4$-$C_{28}$-, most particularly preferably $C_{12}$-$C_{24}$-alkyl radicals. $C_1$-$C_{30}$-Alkyl represents, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpropyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, n-heptyl and n-octyl, pinacyl, adamantyl, the isomeric menthyls, n-nonyl, n-decyl, n-dodecyl, n-tridecyl, n-tetradecyl, n-hexadecyl or n-octadecyl.

Particularly preferred for $R_3$ are $C_1$-$C_{30}$-, particularly preferably $C_1$-$C_{18}$-alkylene radicals. Alkylene represents a straight-chained, cyclic, branched or unbranched alkylene radical. $C_1$-$C_{18}$-Alkylene represents, for example, methylene, ethylene, n-propylene, isopropylene, n-butylene, n-pentylene, n-hexylene, n-heptylene, n-octylene, n-nonylene, n-decylene, n-dodecylene, n-tridecylene, n-tetradecylene, n-hexadecylene or n-octadecylene.

In the case of esters of polyhydric alcohols, free, non-esterified OH groups can also be present. Aliphatic carboxylic acid esters which are suitable according to the invention are, for example and preferably, glycerol monostearate (GMS), palmityl palmitate and stearyl stearate. Mixtures of different carboxylic acid esters of formula (IV) can also be used. Carboxylic acid esters which are preferably used are additionally mono- or poly-esters of pentaerythritol, glycerol, trimethylolpropane, propanediol, stearyl alcohol, cetyl alcohol or myristyl alcohol with myristic, palmitic, stearic or montanic acid and mixtures thereof. Pentaerythritol tetrastearate, glycerol monostearate, stearyl stearate and propanediol distearate, or mixtures thereof, are particularly preferred.

A particularly preferred demoulding agent according to the invention is pentaerythritol tetrastearate and glycerol monostearate, in particular pentaerythritol tetrastearate.

Component d

Thermoplastic polyesters according to component d which can be used according to the invention are polyalkylene terephthalates, which can be prepared by methods known in the literature (see e.g. Kunststoff-Handbuch, Volume VIII, p, 695 ff, Carl-Hanser-Verlag, Munich 1973).

In a preferred embodiment, the polyalkylene terephthalates are reaction products of aromatic dicarboxylic acids or reactive derivatives thereof, such as dimethyl esters or anhydrides, and aliphatic, cycloaliphatic or araliphatic diols, as well as mixtures of these reaction products.

Particularly preferred polyalkylene terephthalates contain at least 80 wt. %, preferably at least 90 wt. %, based on the dicarboxylic acid component, terephthalic acid radicals and at least 80 wt. %, preferably at least 90 mol %, based on the diol component, ethylene glycol and/or 1,4-butanediol radicals.

Particular preference is given to polyalkylene terephthalates which have been prepared solely from terephthalic acid and reactive derivatives thereof (e.g. dialkyl esters thereof) and ethylene glycol and/or 1,4-butanediol, and mixtures of these polyalkylene terephthalates. Polyalkylene terephthalates which are particularly preferably used according to the invention are polybutylene terephthalate (PBT) and polyethylene terephthalate (PET).

Component e

There can be used according to the invention as component e any elastomers other than component f which have a glass transition temperature <10° C., preferably <0° C., particularly preferably <−20° C.

There are preferably used as component e, for example, thermoplastic elastomers such as, for example, olefin-based thermoplastic elastomers (TPO), polyurethane-based thermoplastic elastomers (TPU), and thermoplastic styrene block copolymers (TPS).

Unless expressly described otherwise in the present invention, the glass transition temperature is determined for all components by means of differential scanning calorimetry (DSC) according to DIN EN 61006 at a heating rate of 10 K/min with determination of the Tg as the mid-point temperature (tangent method).

Component f

Rubber-modified vinyl (co)polymers which can be used according to the invention as component fare one or more graft polymers of f.1 from 5 to 95 wt. %, preferably from 10 to 90 wt. %, particularly preferably from 30 to 60 wt. %, of at least one vinyl monomer on f.2 from 95 to 5 wt. %, preferably from 90 to 10 wt. %, particularly preferably from 70 to 40 wt. %, of one or more graft bases having glass transition temperatures <10° C., preferably <0° C., particularly preferably <−20° C.

The graft base f.2 generally has a mean particle size (d50 value) of from 0.05 to 10.00 μm, preferably from 0.10 to 5.00 μm, more preferably from 0.15 to 1.00 μm and particularly preferably from 0.2 to 0.5 μm.

The mean particle size d50 is the diameter above and below which in each case 50 wt. % of the particles lie. It can be determined by means of ultracentrifuge measurement (W. Scholtan, H. Lange, Kolloid, Z. und Z. Polymere 250 (1972), 782-1796).

Monomers f.1 are preferably mixtures of f.1.1 from 50 to 99 parts by weight of vinyl aromatic compounds and/or vinyl aromatic compounds substituted on the ring (such as styrene, α-methylstyrene, p-methylstyrene, p-chlorostyrene) and/or (meth)acrylic acid (C1-C8)-alkyl esters, such as methyl methacrylate, ethyl methacrylate, and f.1.2 from 1 to 50 parts by weight of vinyl cyanides (unsaturated nitriles such as acrylonitrile and methacrylonitrile) and/or (meth)acrylic acid (C1-C8)-alkyl esters, such as methyl methacrylate, n-butyl acrylate, tert-butyl acrylate, and/or derivatives (such as anhydrides and imides) of unsaturated carboxylic acids, for example maleic anhydride.

Preferred monomers f.1.1 are selected from at least one of the monomers styrene, α-methylstyrene and methyl methacrylate, preferred monomers f.1.2 are selected from at least one of the monomers acrylonitrile, maleic anhydride and methyl methacrylate. Particularly preferred monomers are f.1.1 styrene and f.1.2 acrylonitrile.

Graft bases f.2 suitable for the graft polymers according to component f are, for example, diene rubbers, EP(D)M rubbers, that is to say those based on ethylene/propylene and optionally diene, acrylate, polyurethane, silicone, chloroprene, ethylene/vinyl acetate and acrylate-silicone composite rubbers.

Preferred graft bases f.2 are diene rubbers, for example based on butadiene and isoprene, or mixtures of diene rubbers or copolymers of diene rubbers or mixtures thereof with further copolymerisable monomers (e.g. according to f.1.1 and f.1.2), with the proviso that the glass transition temperature of component f.2 is below <10° C., preferably <0° C., particularly preferably <−10° C. Pure polybutadiene rubber is particularly preferred.

The gel content of the graft base f.2 is at least 30 wt. %, preferably at least 40 wt. %, particularly preferably at least 70 wt. % (measured in toluene).

The gel content of the graft base f.2 is determined at 25° C. in a suitable solvent (M. Hoffmann, H. Krömer, R. Kuhn, Polymeranalytik I und II, Georg Thieme-Verlag, Stuttgart 1977).

Particularly preferred rubber-modified vinyl (co)polymers according to component f are, for example, ABS polymers (emulsion, mass and suspension ABS), as are described, for example, in DE-OS 2 035 390 (=U.S. Pat. No. 3,644,574) or in DE-OS 2 248 242 (=GB-PS 1 409 275) or in Ullmanns, Enzyklopädie der Technischen Chemie, Vol. 19 (1980), p. 280 ff.

The graft copolymers according to component f are prepared by radical polymerisation, for example by emulsion, suspension, solution or mass polymerisation, preferably by emulsion or mass polymerisation, particularly preferably by emulsion polymerisation.

Particularly suitable graft rubbers are also ABS polymers which are prepared by the emulsion polymerisation process by redox initiation with an initiator system comprising organic hydroperoxide and ascorbic acid according to U.S. Pat. No. 4,937,285.

Because it is known that, in the graft reaction, the graft monomers are not necessarily grafted onto the graft base completely, rubber-modified graft polymers according to component f are also understood according to the invention as being those products which are obtained by (co)polymerisation of the graft monomers f.1 in the presence of the graft base f.2 and which also form during working up.

Acrylate rubbers suitable as the graft base f.2 are preferably polymers of acrylic acid alkyl esters, optionally with up to 40 wt. %, based on f.2, of other polymerisable, ethylenically unsaturated monomers. The preferred polymerisable acrylic acid esters include C1- to C8-alkyl esters, for example methyl, ethyl, butyl, n-octyl and 2-ethylhexyl esters; haloalkyl esters, preferably halo-C1-C8-alkyl esters, such as chloroethyl acrylate, as well as mixtures of these monomers.

For crosslinking, monomers having more than one polymerisable double bond can be copolymerised. Preferred examples of crosslinking monomers are esters of unsaturated monocarboxylic acids having from 3 to 8 carbon atoms and unsaturated monohydric alcohols having from 3 to 12 carbon atoms or saturated polyols having from 2 to 4 OH groups and from 2 to 20 carbon atoms, such as ethylene glycol dimethacrylate, allyl methacrylate; polyunsaturated heterocyclic compounds, such as trivinyl and triallyl cyanurate; polyfunctional vinyl compounds, such as di- and tri-vinylbenzenes; but also triallyl phosphate and diallyl phthalate. Preferred crosslinking monomers are allyl methacrylate, ethylene glycol dimethacrylate, diallyl phthalate, and heterocyclic compounds which contain at least three ethylenically unsaturated groups. Particularly preferred crosslinking monomers are the cyclic monomers triallyl cyanurate, triallyl isocyanurate, triacryloyl-hexahydro-s-triazine, triallyl benzenes. The amount of crosslinked monomers is preferably from 0.02 to 5.00 wt. %, in particular from 0.05 to 2.00 wt. %, based on the graft base B.2. In the case of cyclic crosslinking monomers having at least three ethylenically unsaturated groups, it is advantageous to limit the amount to less than 1 wt. % of the graft base f.2.

Preferred "other" polymerisable, ethylenically unsaturated monomers which can optionally be used in addition to the acrylic acid esters for the preparation of acrylate rubbers suitable as the graft base f.2 are, for example, acrylonitrile, styrene, α-methylstyrene, acrylamides, vinyl C1-C6-alkyl ethers, methyl methacrylate, butadiene. Preferred acrylate rubbers as the graft base f.2 are emulsion polymers having a gel content of at least 60 wt. %.

Further suitable graft bases according to f.2 are silicone rubbers having graft-active sites, as are described in DE-OS 3 704 657, DE-OS 3 704 655, DE-OS 3 631 540 and DE-OS 3 631 539.

Rubber-free vinyl (co)polymers which can be used according to the invention as component f are, for example and preferably, homo- and/or co-polymers of at least one monomer from the group of the vinyl aromatic compounds, vinyl cyanides (unsaturated nitriles), (meth)acrylic acid (C1-C8)-alkyl esters, unsaturated carboxylic acids, as well as derivatives (such as anhydrides and imides) of unsaturated carboxylic acids.

Particularly suitable are (co)polymers of from 50 to 99 parts by weight, preferably from 60 to 80 parts by weight, in particular from 70 to 80 parts by weight, in each case based on the (co)polymer, of at least one monomer selected from the group of the vinyl aromatic compounds (such as, for example, styrene, α-methylstyrene), vinyl aromatic compounds substituted on the ring (such as, for example, p-methylstyrene, p-chlorostyrene) and (meth)acrylic acid (C1-C8)-alkyl esters (such as, for example, methyl methacrylate, n-butyl acrylate, tert-butyl acrylate), and from 1 to 50 parts by weight, preferably from 20 to 40 parts by weight, in particular from 20 to 30 parts by weight, in each case based on the (co)polymer, of at least one monomer selected from the group of the vinyl cyanides (such as, for example, unsaturated nitriles such as acrylonitrile and methacrylonitrile), (meth)acrylic acid (C1-C8)-alkyl esters (such as, for example, methyl methacrylate, n-butyl acrylate, tert-butyl acrylate), unsaturated carboxylic acids and derivatives of unsaturated carboxylic acids (for example maleic anhydride and N-phenyl-maleimide). The copolymer of styrene and acrylonitrile is particularly preferred.

Such vinyl (co)polymers are known and can be prepared by radical polymerisation, in particular by emulsion, suspension, solution or mass polymerisation.

In an embodiment which is particularly preferred according to the invention, the vinyl (co)polymers have a weight-average molar mass $M_w$ (determined by gel chromatography in dichloromethane with polystyrene calibration) of from 50,000 to 250,000 g/mol, particularly preferably from 70,000 to 180,000 g/mol.

Component g

Additives according to component g which can be used according to the invention are, for example, flameproofing agents (for example halogen compounds or phosphorus compounds such as monomeric or oligomeric organic phosphoric acid esters, phosphazenes or phosphonate amines, in particular bisphenol A diphosphate, resorcinol diphosphate and triphenyl phosphate), flameproofing synergists (for example nano-scale metal oxides), smoke-inhibiting additives (for example boric acid or borates), antidripping agents (for example compounds of the substance classes of the fluorinated polyolefins, of the silicones as well as aramid fibres), antistatics (for example block copolymers of ethylene oxide and propylene oxide, other polyethers or polyhydroxy ethers, polyether amides, polyester amides or sulfonic acid salts), conductivity additives other than the definition of component b, stabilisers (for example UV/light stabilisers, heat stabilisers, antioxidants, transesterification inhibitors, hydrolytic stabilisers), additives having antibacterial action (for example silver or silver salts), additives improving scratch resistance (for example silicone oils or hard fillers such as (hollow) ceramics beads), IR absorbers, optical brightening agents, fluorescent additives, fillers and reinforcing substances other than the definition of component b (for example talc, optionally ground glass fibres, (hollow) glass or ceramics beads, mica, kaolin, $CaCO_3$ and glass flakes), colourings, ground thermoplastic polymers and Brönstedt-acidic compounds as base acceptors, or mixtures of a plurality of the mentioned additives.

The polymer mixtures prepared according to the invention are preferably used in the production of injection-moulded articles or of extrudates in which particular demands are made as regards the homogeneity and freedom from defects of the surfaces.

Examples of moulded articles according to the invention are profiles, films, casing parts of any kind, in particular casing parts for computers, laptops, mobile telephones, television surrounds; for office equipment such as monitors, printers, copiers; for sheets, tubes, conduits for electrical installations, windows, doors and profiles for the construction sector, interior fitting and external applications; in the field of electrical engineering, for example for switches and sockets. The moulded articles according to the invention can also be used for interior fittings for passenger vehicles, railway vehicles, ships, aircraft, buses and other motor vehicles, as well as for automotive bodywork parts. Further moulded articles are food and drinks packaging and structural components which are galvanised or metallised after injection moulding.

EXAMPLES

Raw Materials Used a1

Linear polycarbonate based on bisphenol A having a weight-average molecular weight $M_w$ of 17,000 g/mol (determined by GPC in methylene chloride at 25° C. with polycarbonate calibration).

a2

Linear polycarbonate based on bisphenol A having a weight-average molecular weight $M_w$ of 25,000 g/mol (determined by GPC in methylene chloride at 25° C. with polycarbonate calibration).

a3

Linear polycarbonate based on bisphenol A having a weight-average molecular weight $M_w$ of 28,000 g/mol (determined by GPC in methylene chloride at 25° C. with polycarbonate calibration).

a4

Linear polycarbonate based on bisphenol A having a weight-average molecular weight $M_w$ of 30,000 g/mol (determined by GPC in methylene chloride at 25° C. with polycarbonate calibration).

a5

Linear polycarbonate based on bisphenol A having a weight-average molecular weight $M_w$ of 36,000 g/mol (determined by GPC in methylene chloride at 25° C. with polycarbonate calibration)

a6

Linear copolycarbonate of bisphenol A and 1,1-bis-(4-hydroxyphenyl)-3,3,5-trimethylcyclohexane in a mixing ratio of 70 wt. %:30 wt. % having a melt viscosity measured according to ISO 11433 at a temperature of 340° C. and a shear rate of 1000 $s^{-1}$ of 400 Pas.

a7

Linear polycarbonate of bisphenol A and 1,1-bis-(4-hydroxyphenyl)-3,3,5-trimethylcyclohexane in a mixing ratio of 30 wt. %:70 wt. % having a melt viscosity measured according to ISO 11433 at a temperature of 340° C. and a shear rate of 1000 $s^{-1}$ of 320 Pas.

a8

Component a2 ground to powder a9

Linear polycarbonate based on bisphenol A having a weight-average molecular weight $M_w$ of 32,000 g/mol (determined by GPC in methylene chloride at 25° C. with polycarbonate calibration), ground to powder b1

Black Pearls 800 (Cabot Corporation, Leuven, Belgium): pearled pigment carbon black having a mean primary particle size determined by scanning electron microscopy of 17 nm, a BET surface area determined according to ISO 4652 by nitrogen adsorption of 210 $m^2/g$ and an oil adsorption number measured according to ISO 4656 with dibutyl phthalate (DBP) of 65 ml/100 g.

b2

Printex 85 (Evonik Degussa GmbH, Frankfurt/Main, Germany): pigment carbon black having a mean primary particle size determined by scanning electron microscopy of 16 nm, a BET surface area determined according to ISO 4652 by nitrogen adsorption of 200 $m^2/g$ and an oil adsorption number measured according to ISO 4656 with dibutyl phthalate (DBP) of 48 ml/100 g.

b3

Chromium rutile pigment b4

Iron oxide pigment c1

Pentaerythritol tetrastearate (PETS)

c2

Glycerol monostearate (GMS)

c3

Stearyl stearate c4

LDPE wax (low-density polyethylene wax)

d1

Linear polyethylene terephthalate having an intrinsic viscosity of 0.665 measured in phenol/o-dichlorobenzene (1:1 parts by weight) at 25° C.

d2

Linear polybutylene terephthalate having a melt volume flow rate of 45 $cm^2$/10 min at 250° C. and 2.16 kg load f1

Emulsion ABS granules with an A:B:S weight ratio of 20:24:56 f2

Mass ABS granules with an A:B:S weight ratio of 25:10:65 f3

Graft polymer consisting of 28 wt. % styrene-acrylonitrile copolymer with a ratio of styrene to acrylonitrile of 71 to 29 parts by weight as shell on 72 wt. % of a particulate graft base as core consisting of 46 parts by weight, based on the graft base, of silicone rubber and 54 parts by weight, based on the graft base, of butyl acrylate rubber, prepared by the emulsion polymerisation process.

f4

Emulsions ABS graft in powder form with an A:B:S weight ratio of 12:58:30 f5

Emulsions ABS graft in powder form with an A:B:S weight ratio of 7:75:18 f6

Polymethyl methacrylate (PMMA)-grafted silicone-butyl acrylate composite rubber graft in powder form, prepared by emulsion polymerisation, consisting of a graft shell of 10 wt. %, based on the graft, of polymethyl methacrylate and 90 wt. %, based on the graft, of particulate silicone-butyl acrylate composite rubber base with a silicone content, based on the silicone-butyl acrylate composite rubber base, of 30 wt. % and a butyl acrylate content, based on the silicone-butyl acrylate composite rubber base, of 70 wt. %.

f7

Styrene-acrylonitrile copolymer (SAN) with an A:S weight ratio of 24:76 g1

Bisphenol A-based oligophosphate

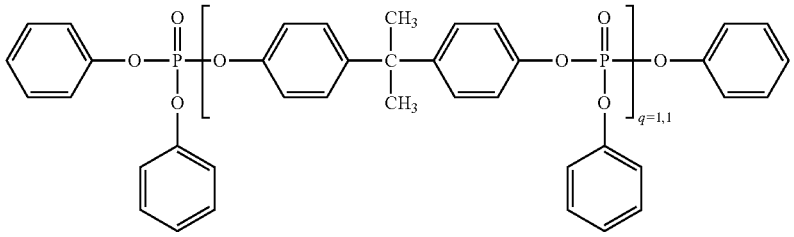

q=degree of oligomerisation g2

Polytetrafluoroethylene (PTFE) concentrate consisting of 50 wt. % styrene-acrylonitrile (SAN) copolymer and 50 wt. % PTFE g3

Stabilisers g4

Talc with a $d_{50}$ of 1.2 μm.

g5

Water

A) Carbon Black Masterbatches

The carbon black/demoulding agent masterbatches 1 to 14 listed in table 1 under component B were prepared as described below.

A.1) Mixing Units Used

Test Arrangement 1

A type MDK/E 46 co-kneader from Buss was used. FIG. 1 shows the structure in principle. The mixture components were metered into the feed hopper 1 of the Buss co-kneader 2. The mixture components were there taken into the co-kneader 2 by the screw (not shown) located on the inside and were conveyed axially. In the region of the retaining ring 3, accumulation of the mixture components took place, as well as melting of the demoulding agent, intimate mixing of the mixture components and dispersion of the carbon black. In the region of the retaining ring 4, accumulation of the melt mixture took place, as well as further mixing of the mixture components and dispersion of the carbon black. In the regions between the feed hopper 1 and the retaining ring 3, the retaining ring 3 and the retaining ring 4 and the retaining ring 4 and the single-shaft extruder 5 flange-mounted on the co-kneader 2, the kneading blades were so arranged on the screw shaft that the melt mixture was conveyed axially in the direction of the single-shaft extruder 5. In the single-shaft extruder 5, the melt mixture was conveyed through the single-shaft screw (not shown) and degassed at the degassing opening 6. At the end of the single-shaft extruder 5 there is a spray head (not shown) having a nozzle plate with 8 holes, each of which has a diameter of 2.5 mm. The melt strands emerging from the nozzle plate were then granulated by means of a hot-face water-ring granulating system (not shown) known to the person skilled in the art to form granules having a length of up to 5 mm and were cooled. The water adhering to the granules was then removed by means of a vibro screen (not shown) and subsequent drying in a fluidised bed dryer (not shown).

Test Arrangement 2

Figure 2:
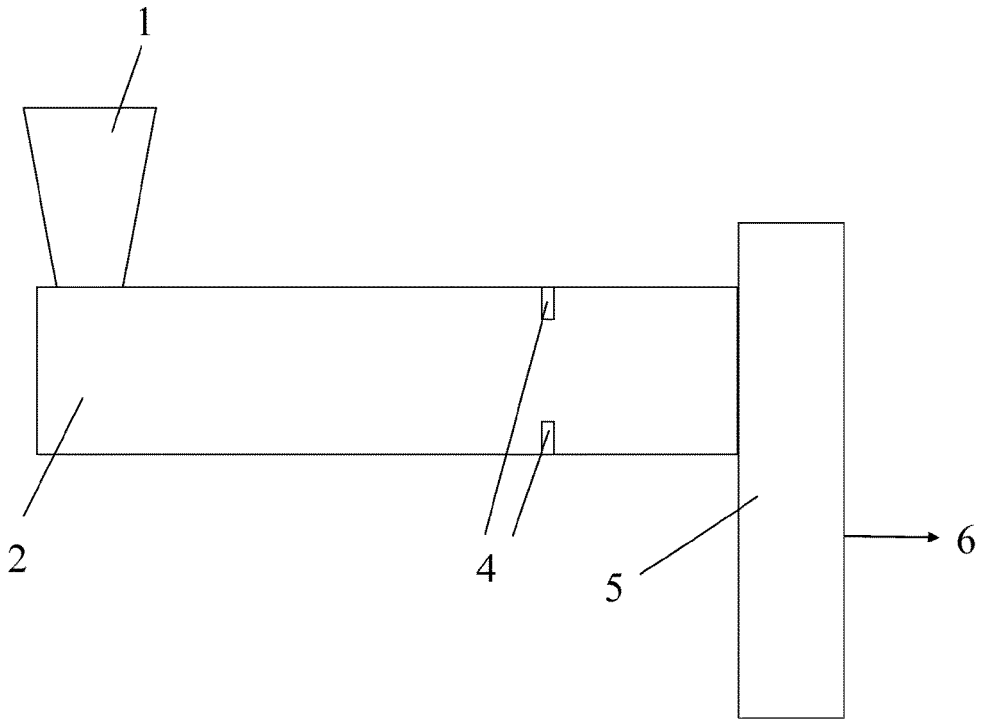
FIG. 2 shows a structure of a co-kneader without a retaining ring.

As arrangement 1 but without retaining ring 3 (see FIG. 2), so that the energy input of the co-kneader in test arrangement 2 is lower as compared with test arrangement 1.

Test Arrangement 3

Figure 3:
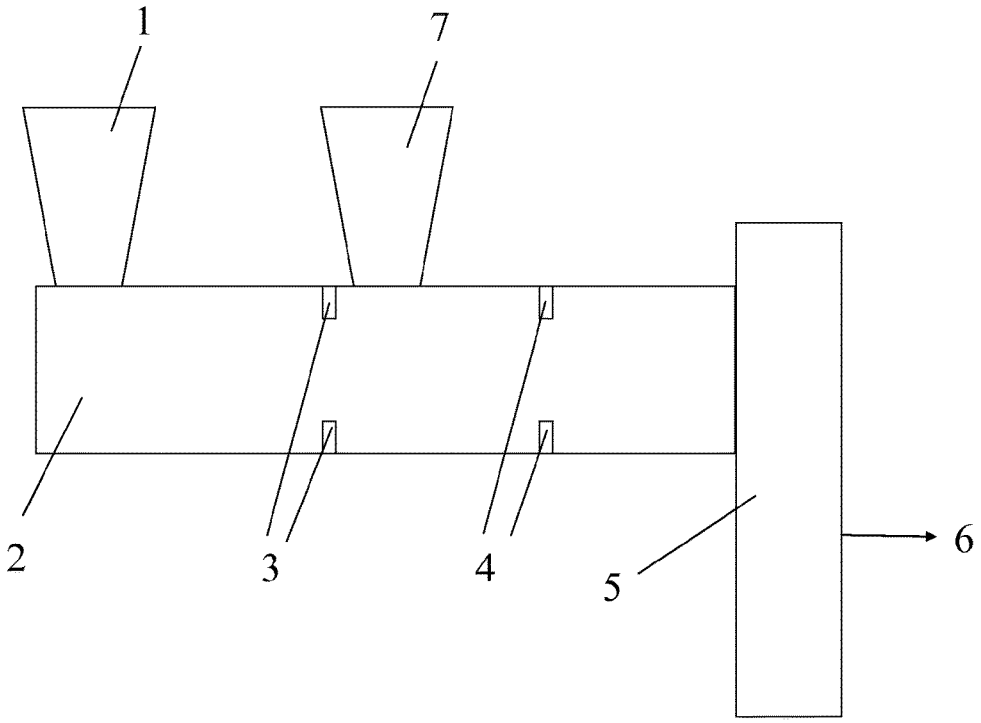
FIG. 3 shows a structure of a co-kneader with a metering hopper.

As arrangement 1 but with an additional metering hopper 7 downstream of retaining ring 3 (see FIG. 3), so that the carbon black is added in two portions in two steps via metering hoppers 1 and 7.

Test Arrangement 4

An Evolum HT32 twin-screw extruder from Clextral with a housing inside diameter of 32 mm, a ratio of screw outside diameter to screw inside diameter of 1.55 and a length-to-diameter ratio of 44 was used. The twin-screw extruder has a housing consisting of 11 parts, in which two co-rotating, intermeshing shafts (not shown) are arranged.

Figure 4:
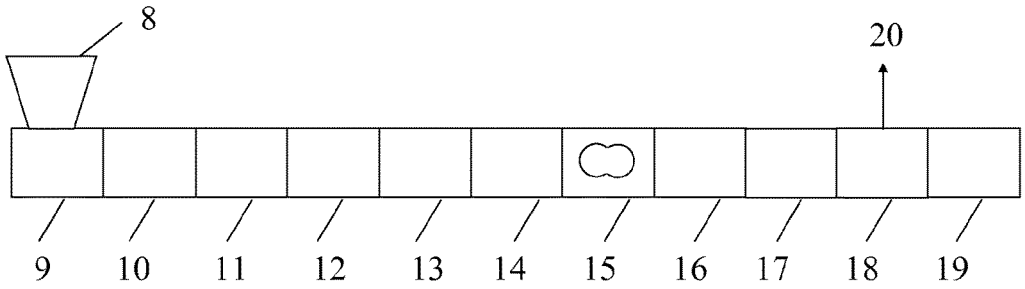
FIG. 4 shows a structure of an extruder with a length-to-diameter ratio of 44.

The structure of the extruder used is shown in principle in FIG. 4.

Metering of a portion of the pulverulent carbon black and of the pulverulent demoulding agent was carried out by means of differential proportioning weighers (not shown) via the feed hopper 8 into the main intake of the extruder in housing 9 (intake housing).

In the region of housings 9 to 11 there is a feed zone in which the mixture constituents are taken into the extruder in the solid state and conveyed further.

In the region of housing 12 there is a plastification zone, which consists of various conveying double- and triple-threaded kneading blocks of different widths and a return element at the end of the zone.

In the region of housings 13 and 14 there is a mixing zone, which consists of various mixing, kneading and feed elements.

In housing 15, the remaining portion of the pulverulent carbon black is metered into the extruder via a lateral feed device.

In the region of housings 16 and 17 there is a further mixing zone which consists of various mixing, kneading and feed elements.

In housing part 18 (degassing housing) there is the degassing opening 20, which is connected to a suction device (not shown).

In housing 19 (discharge housing) there the pressure build-up zone, which is followed by a spray head (not shown) having a nozzle plate with 6 holes, each of which has a diameter of 3.2 mm.

Test Arrangement 5

A type MDK/E 100 co-kneader from Buss was used. The structure corresponded in principle to the structure of test arrangement 3.

Test Arrangement 6

A shear roller unit was used, as is described, for example, in EP 0707037 B1.

A.2) Preparation of Masterbatches B1-B16

Carbon black/demoulding agent masterbatches B1 to B4 were prepared using the test arrangements, process parameters and formulations indicated in Table 2.

The specific mechanical energy input (SME) indicated in Table 2 was determined according to equation 1.

$$SME = \frac{2 \cdot \pi \cdot M \cdot n}{\dot{m} \cdot 60000} \quad \text{Equation 1}$$

SME: specific mechanical energy input in kWh/kg

M: torque in Nm n: speed in l/min $\dot{m}$: throughput in kg/h

Carbon black/demoulding agent masterbatch B5 was prepared using test arrangement 5 from 58% b1 and 42% c1.

Carbon black/demoulding agent masterbatches B6 and B7 were prepared using test arrangement 6 from 50% b1 and 50% c1 (B6) and 65% b1 and 35% c1 (B7).

Carbon black/demoulding agent masterbatches B8 to B14 were prepared using the test arrangements, process parameters and formulations indicated in Table 3. The specific mechanical energy input (SME) indicated in Table 3 was calculated according to equation 1.

The carbon black/polycarbonate masterbatch B15 was supplied by Color System S.p.a. Carbon black/polycarbonate masterbatch consisting of 15 wt. % b1 and 85 wt. % of a bisphenol A-based polycarbonate having a relative solution viscosity of 1.28 (measured in methylene chloride at 25° C.).

The carbon black/polyethylene masterbatch B16 was supplied by Cabot (trade name: Plasblak PE6130). Carbon black/polyethylene masterbatch containing 50 wt. % carbon black.

B) PC Moulding Compositions

B.1) Mixing Units Used

Test Arrangement 7

An Evolum HT32 twin-screw extruder from Clextral having a housing inside diameter of 32 mm, a ratio of screw outside diameter to screw inside diameter of 1.55 and a length-to-diameter ratio of 36 was used. The twin-screw extruder has a housing consisting of 9 parts, in which two co-rotating, intermeshing shafts (not shown) are arranged.

Figure 5:
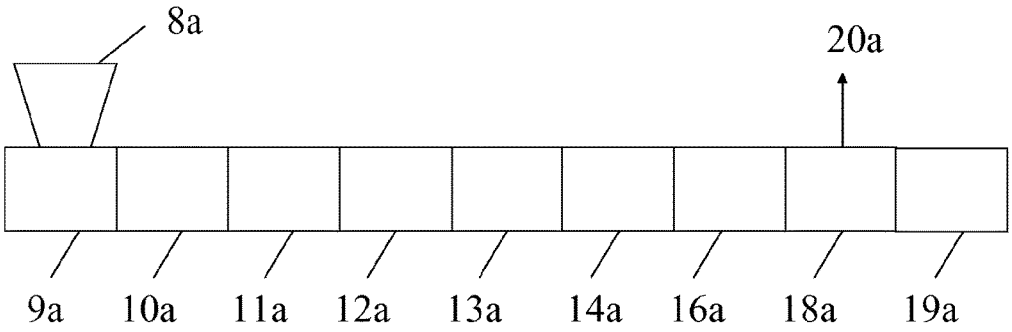
FIG. 5 shows a structure of an extruder with a length-to-diameter ratio of 36.

The structure of the extruder used is shown in principle in FIG. 5

Metering of all the components was carried out by means of differential proportioning weighers (not shown) via the feed hopper 8a into the main intake of the extruder in housing 9a (intake housing).

In the region of housings 9a to 13a there is a feed zone in which the mixture constituents are taken into the extruder in the solid state and conveyed further.

In the region of housings 14a and 16a there is a plastification zone, which consists of various conveying double- and triple-threaded kneading blocks of different widths and a return element at the end of the zone.

In the region of housings 16a and 18a there is a mixing zone which consists of various mixing and feed elements.

In housing part 18a (degassing housing) there is the degassing opening 20a, which is connected to a suction device (not shown).

In housing 19a (discharge housing) there is the pressure build-up zone, which is followed by a spray head (not shown) having a nozzle plate with 6 holes, each of which has a diameter of 3.2 mm.

Test Arrangement 8

Figure 6:
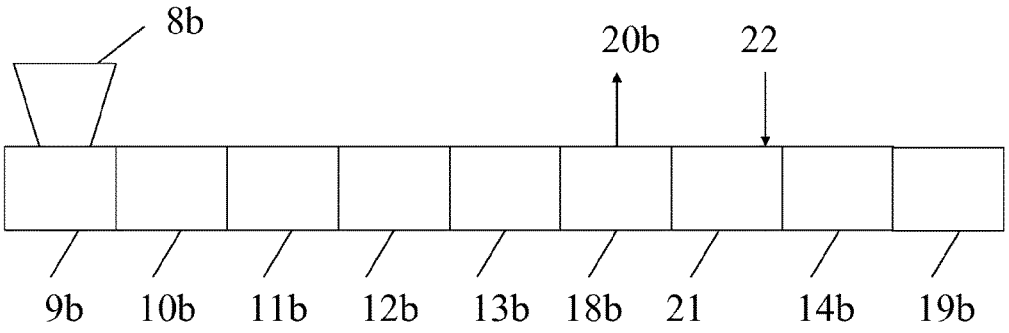
FIG. 6 shows a structure of an extruder with an injection valve.

As test arrangement 7 but with an injection valve 22 arranged at the end of housing part 21, via which the liquid additive 1 is metered in formulations 20 and 21 (FIG. 6).

Test Arrangement 9

Figure 7:
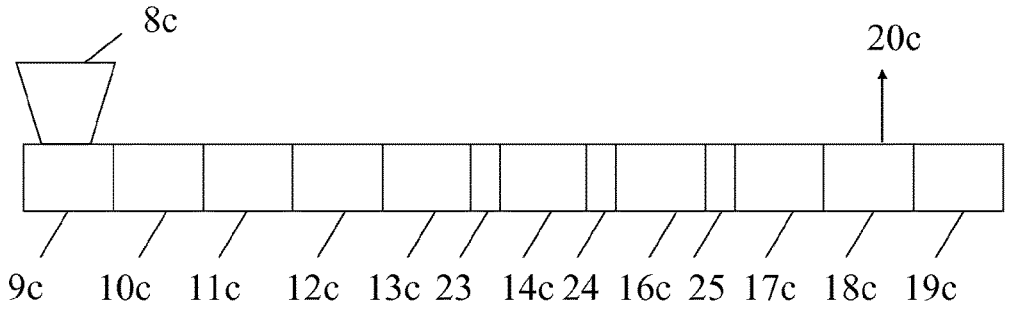
FIG. 7 shows a structure of an extruder with a length-to-diameter ratio of 48.

A ZSK 25 WLE twin-screw extruder from Coperion Werner & Pfleiderer having a housing inside diameter of 25.2 mm, a ratio of screw outside diameter to screw inside diameter of 1.50 and a length-to-diameter ratio of 48 was used. The twin-screw extruder has a housing consisting of 13 parts, in which two co-rotating, intermeshing shafts (not shown) are arranged. The structure of the extruder used is shown in principle in FIG. 7. Metering of all the components was carried out by means of differential proportioning weighers (not shown) via the feed hopper 8c into the main intake of the extruder in housing 9c (intake housing). In the region of housings 9c to 12c there is a feed zone in which the mixture constituents are taken into the extruder in the solid state and conveyed further. In the region of housings 13c and 23 (intermediate plate) there is a plastification zone, which consists of various conveying double- and triple-threaded kneading blocks of different widths and a return element at the end of the zone. In the region of housings 14c to 17c there are two mixing zones, which consist of various mixing and feed elements. In housing part 18c there is the degassing opening 20c, which is connected to a suction device (not shown). In housing 19c (discharge housing) there is the pressure build-up zone, which is followed by a spray head (not shown) having a nozzle plate with 2 holes, each of which has a diameter of 4.5 mm.

Test Arrangement 10

Figure 8:
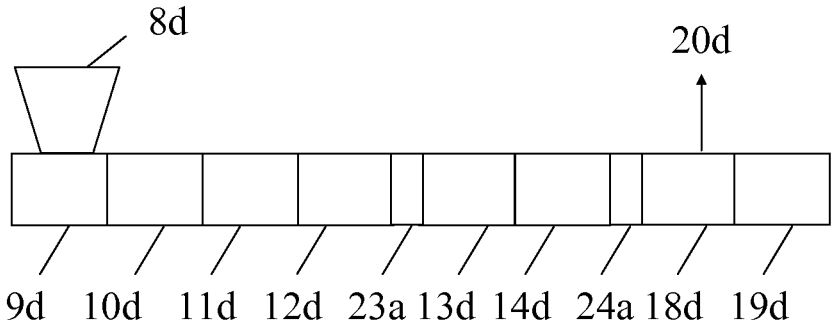
FIG. 8 shows a structure of an extruder with a length-to-diameter ratio of 31.5.

A ZSK 133Sc twin-screw extruder from Coperion Werner & Pfleiderer having a housing inside diameter of 134.4 mm, a ratio of screw outside diameter to screw inside diameter of 1.55 and a length-to-diameter ratio of 31.5 was used. The twin-screw extruder has a housing consisting of 10 parts, in which two co-rotating, intermeshing shafts (not shown) are arranged. The structure of the extruder used is shown in principle in FIG. 8. Metering of all the components was carried out by means of differential proportioning weighers (not shown) via the feed hopper 8d into the main intake of the extruder in housing 9d (intake housing). In the region of housings 9d to 11d there is a feed zone in which the mixture constituents are taken into the extruder in the solid state and conveyed further. In the region of housings 12d, 23a and 13d there is a plastification zone, which consists of various conveying double- and triple-threaded kneading blocks of different widths and a return element at the end of the zone. In the region of housings 14d, 24a and 18d there is a mixing zone which consists of various mixing and feed elements. In housing part 18d (degassing housing) there is the degassing opening 20d, which is connected to a suction device (not shown). In housing 19d (discharge housing) there is the pressure build-up zone, which is followed by a spray head (not shown) having a nozzle plate with 60 holes, each of which has a diameter of 4.5 mm.

Test Arrangement 11

Figure 9:
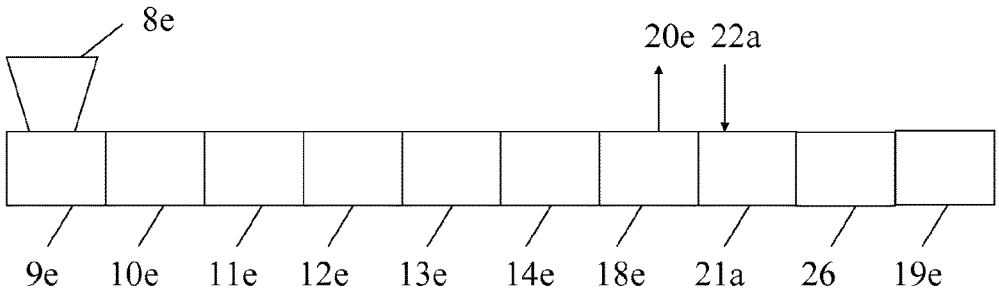
FIG. 9 shows a structure of an extruder with a length-to-diameter ratio of 40.
Figure 9:
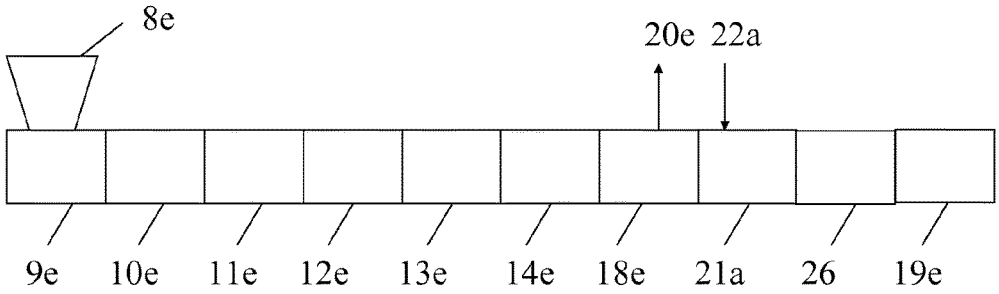
Figure 10:
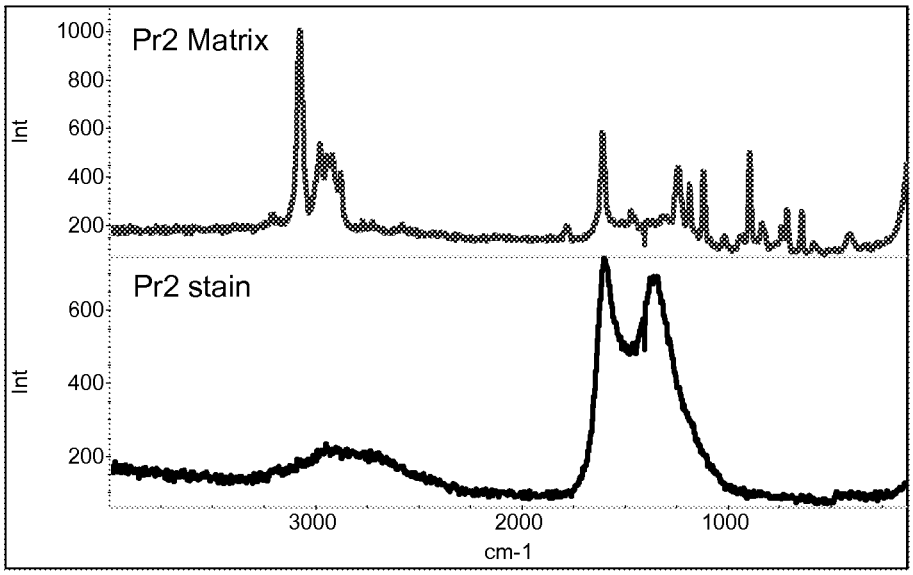
FIG. 10 shows a graph.

A ZSK 92Mc twin-screw extruder from Coperion Werner & Pfleiderer having a housing inside diameter of 92.8 mm, a ratio of screw outside diameter to screw inside diameter of 1.55 and a length-to-diameter ratio of 40 was used. The twin-screw extruder has a housing consisting of 10 parts, in which two co-rotating, intermeshing shafts (not shown) are arranged. The structure of the extruder used is shown in principle in FIG. 9. Metering of all the components was carried out by means of differential proportioning weighers (not shown) via the feed hopper 8e into the main intake of the extruder in housing 9e (intake housing). In the region of housings 9e to 13e there is a feed zone in which the mixture constituents are taken into the extruder in the solid state and conveyed further. In the region of housings 13e and 14e there is a plastification zone, which consists of various conveying double- and triple-threaded kneading blocks of different widths and a return element at the end of the zone. In housing part 18e (degassing housing) there is the degassing opening 20e, which is connected to a suction device (not shown). In housing part 21a there is an injection valve 22a, via which PETSLoxiolPS613,5Spezial is added in liquid form. In the region of housings 21a and 26 there is a mixing zone which consists of various mixing and feed elements. In housing 19e (discharge housing) there is the pressure build-up zone, which is followed by a spray head (not shown) having a nozzle plate with 60 holes, each of which has a diameter of 4.5 mm.

B.2) Preparation of the PC Moulding Compositions

The process parameters used in the examples for the preparation of PC moulding compositions are shown in Table 4. The specific mechanical energy input (SME) indicated in Table 4 was determined according to equation 1.

The PC moulding composition granules prepared in the examples were processed by an injection moulding process to sheets with a glossy surface having a size of 150 mm×105 mm×3.2 mm and to test specimens having a size of 80 mm×10 mm×4 mm for the Izod notched impact test according to ISO 180/1A.

The sheets with a glossy surface were produced on a type FM160 injection moulding machine from Klöcknrer. This injection moulding machine has a cylinder diameter of 45 mm. To that end, the PC moulding composition granules were predried at 110° C. within a period of 4 hours. Processing by injection moulding was carried out under the conditions characteristic for polycarbonates or polycarbonate/ABS blends or polycarbonate/PET blends. An injection moulding tool with a gloss finish (ISO N1) was used for the production of the sheets.

The number of surface defects on the sheets with a glossy surface was measured as described hereinbefore. 3 plates were measured in each case, and the arithmetic mean was determined from the results.

The Izod notched impact strength of the compound prepared was determined according to ISO 180/1A on the test specimens for the notched impact test. To that end, in each case 10 test specimens were tested, and the arithmetic mean was determined from these results.

Example 1

Comparison

An elastomer-containing polycarbonate blend having a melt volume flow rate (MVR) of 27 $cm^3$/10 min (measured according to ISO 1133 at 260° C. and 5 kg) was prepared according to formulation 1 (Table 1) using test arrangement 7. Carbon black powder according to Table 1 was added as the carbon black component.

For the preparation of the compound, a premix was first prepared from components b (carbon black component), c (demoulding agent) and g (additives) and also a9 given in Table 1 in the mentioned amounts, Mixing of the premix was carried out in a container mixer from Mixaco (type CM30 with Z tool) for 4.5 minutes at a speed of 300 l/min and a degree of filling of the mixer of 80%.

The premix and the remaining mixture constituents listed in Table 1 where then metered separately from one another, in each case by means of a differential proportioning weigher (not shown), via the feed hopper 8a into the main intake into housing 9a of the extruder.

In the plastification zone and the mixing zone in the region of housings 14a, 16a and 18a, the meltable mixture constituents were melted, all the mixture constituents were dispersed and the melt mixture was homogenised, the melt being degassed in the penultimate housing part 18a.

The melt strands emerging from the nozzle plate were cooled in a water bath and then granulated by means of a strand granulator.

The process parameters of the extruder and the number, measured as described above, of surface defects, based on one square centimeter, and the measured notched impact strength according to ISO 180/1A are listed in Table 4 under Example 1.

Example 2

According to the Invention

An elastomer-containing polycarbonate blend having a melt volume flow rate (MVR) of 27 $cm^{-1}$/10 min (measured according to ISO 1133 at 260° C. and 5 kg) was prepared according to formulation 4 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component), f (elastomer) and g (additives) given in Table 1 in the mentioned amounts. Preparation of the premix and compounding of the moulding composition were carried out as described in Example 1.

The process parameters of the extruder and the number, measured as described above, of surface defects, based on one square centimeter, and the measured notched impact strength according to ISO 180/1A are listed in Table 4 under Example 2.

A comparison of Example 2 according to the invention with Comparison Example 1 shows that, when the carbon black/demoulding agent masterbatch is used, the number of surface defects is markedly smaller and the notched impact strength at 23° C. and at 0° C. is markedly higher than when the carbon black powder is used. Both these findings indicate better dispersion of the carbon black when the carbon black/demoulding agent masterbatch is used, even though the specific mechanical energy input (SME) has remained almost the same.

Example 3

Comparison

An elastomer-containing polycarbonate blend having a melt volume flow rate (MVR) of 18 $cm^3$/O-min (measured according to ISO 1133 at 260° C. and 5 kg) was prepared according to formulation 18 (see Table 1) using test arrangement 7. Carbon black powder according to Table 1 was added as the carbon black component.

For the preparation of the compound, a premix was first prepared from components b (carbon black component), c (demoulding agent) and g (additives) and also f4 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 3.

Example 4

According to the Invention

An elastomer-containing polycarbonate blend having a melt volume flow rate (MVR) of 18 $cm^3$/10 min (measured according to ISO 1133 at 260° C. and 5 kg) was prepared according to formulation 19 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component) and g (additives) and also f4 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 4.

A comparison of Example 4 according to the invention with Comparison Example 3 shows that, when the carbon black/demoulding agent masterbatch is used, the number of surface defects is markedly smaller than when the carbon black powder is used. Both these findings indicate better dispersion of the carbon black when the carbon black/demoulding agent masterbatch is used, even though the specific mechanical energy input (SME) has remained the same. A comparison of Examples 1 to 4 shows that, in the case of elastomer-containing polycarbonate blends with markedly different melt volume flow rates too, the number of surface defects when the carbon black/demoulding agent masterbatch is used is markedly smaller than when the carbon black powder is used.

Example 5

Comparison

A flame-protected elastomer-containing polycarbonate blend was prepared according to formulation 20 (see Table 1) using test arrangement 8. Carbon black powder according to Table 1 was added as the carbon black component.

For the preparation of the compound, a premix was first prepared from components b (carbon black component), c (demoulding agent), g2, g3 and also f4 given in Table 1 in the mentioned amounts. Mixing of the premix was carried out in a container mixer from Mixaco (type CM30 with Z tool) for 4.5 minutes at a speed of 300 l/min degree of filling of the mixer of 80%.

The premix and the remaining mixture constituents listed in Table 1 were then metered separately from one another, in each case by means of a differential proportioning weigher (not shown), via the feed hopper 8b into the main intake into housing 9b of the extruder.

In the plastification zone and the mixing zone in the region of housings 12b and 13b, the meltable mixture constituents were melted, the mixture constituents metered into the main intake were dispersed and the melt mixture was homogenised. The melt was then degassed in housing part 18b. In housing part 21, liquid g1 (flameproofing agent) was added via an injection valve 22 and intimately mixed with the melt in the subsequent mixing zone in housing parts 14b and 19b.

The melt strands emerging from the nozzle plate were cooled in a water bath and then granulated by means of a strand granulator.

The process parameters of the extruder and the number, measured as described above, of surface defects, based on one square centimeter, and the measured notched impact strength according to ISO 180/1A are listed in Table 4 under Example 5.

Example 6

According to the Invention

A flame-protected elastomer-containing polycarbonate blend was prepared according to formulation 21 (see Table 1) using test arrangement 8. Carbon black/demoulding agent masterbatch granules according to Table 1, which were prepared as described under A.2, were added as the carbon black component.

For the preparation of the compound, a premix was first prepared from components b (carbon black component), g2, g3 and also f4 given in Table 1 in the mentioned amounts. Preparation of the premix and compounding of the moulding composition were carried out as described in Example 5.

The process parameters of the extruder and the number, measured as described above, of surface defects, based on one square centimeter, and the measured notched impact strength according to ISO 180/1A are listed in Table 4 under Example 6.

A comparison of Example 6 according to the invention with Comparison Example 5 shows that, when the carbon black/demoulding agent masterbatch is used, the number of surface defects is markedly smaller and the notched impact strength at 23° C. is higher than when the carbon black powder is used. Both these findings indicate better dispersion of the carbon black when the carbon black/demoulding agent masterbatch is used, even though the specific mechanical energy input (SME) has remained almost the same. A comparison of Examples 5 and 6 with Examples 1 to 4 shows that, even when a liquid flameproofing agent is added to an elastomer-containing polycarbonate blend, the number of surface defects is markedly smaller when the carbon black/demoulding agent masterbatch is used than when the carbon black powder is used.

Example 7

Comparison

A polycarbonate compound having a melt volume flow rate (MVR) of 9.5 $cm^3$/10 min (measured according to ISO 1133 at 300° C. and 1.2 kg) was prepared according to formulation 22 (see Table 1) using test arrangement 7. Carbon black powder according to Table 1 was added as the carbon black component.

For the preparation of the compound, a premix was first prepared from components b (carbon black component), c (demoulding agent) and also a9 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 7.

Example 8

According to the Invention

A polycarbonate compound having a melt volume flow rate (MVR) of 9.5 $cm^3$/10 min (measured according to ISO 1133 at 300° C. and 1.2 kg) was prepared according to formulation 23 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component), c (demoulding agent) and also a9 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 8.

A comparison of Example 8 according to the invention with Comparison Example 7 shows that, when the carbon black/demoulding agent masterbatch is used, the number of surface defects is smaller than when the carbon black powder is used. Both these findings indicate better dispersion of the carbon black when the carbon black/demoulding agent masterbatch is used, even though the specific mechanical energy input (SME) has remained almost the same.

Example 9

Comparison

A polycarbonate compound having a melt volume flow rate (MVR) of 5 $cm^3$/10 min (measured according to ISO 1133 at 300° C. and 1.2 kg) was prepared according to formulation 24 (see Table 1) using test arrangement 7. Carbon black powder according to Table 1 was added as the carbon black component.

For the preparation of the compound, a premix was first prepared from components b (carbon black component), c (demoulding agent) and also a9 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 9.

Example 10

According to the Invention

A polycarbonate compound having a melt volume flow rate (MVR) of 5 $cm^3$/10 min (measured according to ISO 1133 at 300° C. and 1.2 kg) was prepared according to formulation 25 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component), c (demoulding agent) and also a9 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 10.

A comparison of Example 10 according to the invention with Comparison Example 9 shows that, when the carbon black/demoulding agent masterbatch is used, the number of surface defects is smaller than when the carbon black powder is used. Both these findings indicate better dispersion of the carbon black when the carbon black/demoulding agent masterbatch is used, even though the specific mechanical energy input (SME) has remained the same.

Example 11

Comparison

A high-temperature-resistant polycarbonate compound (Vicat softening temperature 203° C. measured according to ISO 306 at 50 N; 120° C./h) having a melt volume flow rate (MVR) of 8 $cm^3$/10 min (measured according to ISO 1133 at 330° C. and 2.16 kg) was prepared according to formulation 28 (see Table 1) using test arrangement 7. Carbon black powder according to Table 1 was added as the carbon black component.

For the preparation of the compound, a premix was first prepared from components b (carbon black component), c (demoulding agent) and also a9 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 11.

Example 12

According to the Invention

A high-temperature-resistant polycarbonate compound (Vicat softening temperature 203° C. measured according to ISO 306 at 50 N; 120° C./h) having a melt volume flow rate (MVR) of 8 $cm^3$/10 min (measured according to ISO 1133 at 300° C. and 1.2 kg) was prepared according to formulation 29 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component), c (demoulding agent) and also a9 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 12.

A comparison of Example 12 according to the invention with Comparison Example 11 shows that, when the carbon black/demoulding agent masterbatch is used, the number of surface defects is markedly smaller than when the carbon black powder is used. Both these findings indicate better dispersion of the carbon black when the carbon black/demoulding agent masterbatch is used, even though the specific mechanical energy input (SME) has remained the same.

Example 13

Comparison

A high-temperature-resistant polycarbonate compound (Vicat softening temperature 184° C. measured according to ISO 306 at 50 N; 120° C./h) having a melt volume flow rate (MVR) of 10 $cm^3$/10 min (measured according to ISO 1133 at 330° C. and 2.16 kg) was prepared according to formulation 30 (see Table 1) using test arrangement 7. Carbon black powder according to Table 1 was added as the carbon black component.

For the preparation of the compound, a premix was first prepared from components b (carbon black component) and a9 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 13.

Example 14

According to the Invention

A high-temperature-resistant polycarbonate compound (Vicat softening temperature 184° C. measured according to ISO 306 at 50 N; 120° C./h) having a melt volume flow rate (MVR) of $cm^3$/10 min (measured according to ISO 1133 at 300° C. and 1.2 kg) was prepared according to formulation 31 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component) and a9 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 14.

A comparison of Example 14 according to the invention with Comparison Example 13 shows that, when the carbon black/demoulding agent masterbatch is used, the number of surface defects is markedly smaller than when the carbon black powder is used. Both these findings indicate better dispersion of the carbon black when the carbon black/demoulding agent masterbatch is used, even though the specific mechanical energy input (SME) has remained almost the same.

A comparison of Examples 7 to 14 shows that, in the case of polycarbonate compounds with markedly different melt volume flow rates and Vicat softening temperatures too, the number of surface defects is markedly smaller when the carbon black/demoulding agent masterbatch is used than when the carbon black powder is used.

A comparison of Examples 7 to 14 with Examples 1 to 4 shows that, even in the case of pure polycarbonate compounds without the addition of elastomer-containing components, the number of surface defects is markedly smaller when the carbon black/demoulding agent masterbatch is used than when the carbon black powder is used.

Example 15

Comparison

An elastomer-containing polycarbonate blend having a melt volume flow rate (MVR) of 17 $cm^3$/10 min (measured according to ISO 1133 at 260° C. and 5 kg) was prepared according to formulation 35 (Table 1) using test arrangement 9. Carbon black powder according to Table 1 was added as the carbon black component.

For the preparation of the compound, a premix was first prepared from components b (carbon black component), c (demoulding agent), g (additives) and f6 given in Table 1 in the mentioned amounts. Mixing of the premix was carried out in a container mixer from Mixaco (type CM30 with Z tool) for 4.5 minutes at a speed of 300 l/min and a degree of filling of the mixer of 80%.

The premix and the remaining mixture constituents listed in Table 1 were then metered separately from one another, in each case by means of a differential proportioning weigher (not shown), via the feed hopper 8c into the main intake into housing 9c of the extruder.

In the plastification zone in the region of housings 12c and 13c, the meltable mixture constituents were melted and all the mixture constituents were dispersed. In the mixing zone in the region of housings 24, 16c, 25 and 17c, the melt mixture was intimately mixed and homogenised. The melt was degassed in the penultimate housing part 18c.

The melt strands emerging from the nozzle plate were cooled in a water bath and then granulated by means of a strand granulator.

Figure 11:
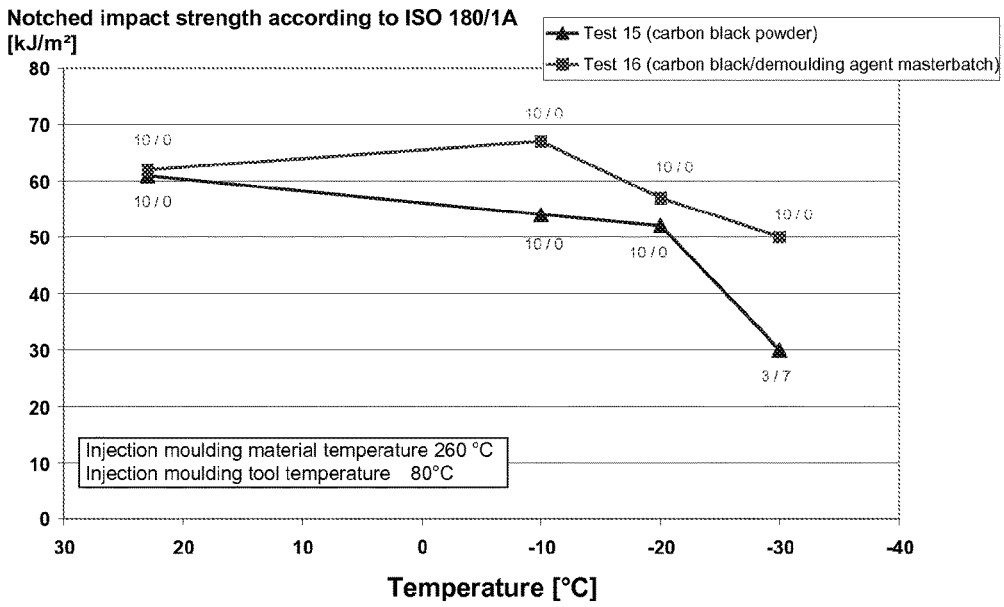
FIG. 11 shows a diagram of the process parameters of an extruder denoting notched impact strength at an ambient temperatures of 260° C.
Figure 12:
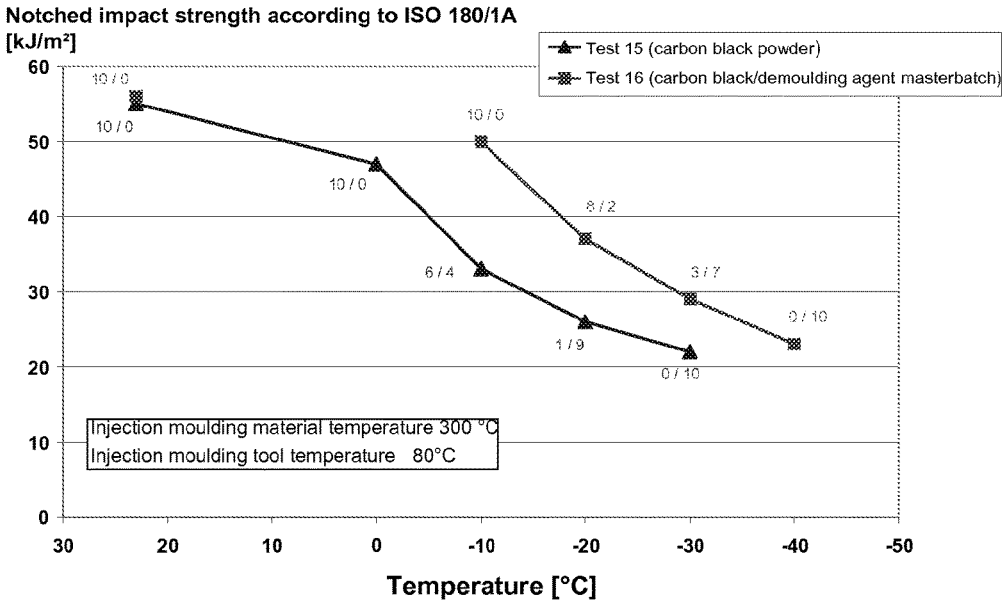
FIG. 12 shows a diagram of the process parameters of an extruder denoting notched impact strength at an ambient temperatures of 300° C.

The process parameters of the extruder are listed in Table 4 under Example 15. The notched impact strength at different ambient temperatures, measured according to ISO 180/1A, is shown in diagrams FIG. 11 for an injection moulding material temperature of 260° C. and FIG. 12 for an injection moulding material temperature of 300° C. Each measuring point in the diagrams represents the mean value of 10 measurements. The number pairs additionally given at the measuring points indicate the number of ductile fractured or brittle fractured test specimens. "10/0" means, for example, that all 10 test specimens tested are ductile fractured.

Example 16

According to the Invention

An elastomer-containing polycarbonate blend having a melt volume flow rate (MVR) of 17 $cm^3$/10 min (measured according to ISO 1133 at 260° C. and 5 kg) was prepared according to formulation 36 (see Table 1) using test arrangement 9. Carbon black/demoulding agent masterbatch granules according to Table 1 which were prepared as described under A.2, were added as the carbon black component.

For the preparation of the compound, a premix was first prepared from components b (carbon black component), g (additives) and f6 given in Table 1 in the mentioned amounts. Preparation of the premix and compounding of the moulding composition were carried out as described in Example 15.

The process parameters of the extruder are listed in Table 4 under Example 16. The notched impact strength at different ambient temperatures, measured according to ISO 180/1A, is shown in diagrams FIG. 11 for an injection moulding material temperature of 260° C. and FIG. 12 for an injection moulding material temperature of 300° C. Each measuring point in the diagrams represents the mean value of 10 measurements. The number pairs additionally given at the measuring points indicate the number of ductile fractured or brittle fractured test specimens. "10/0" means, for example, that all 10 test specimens tested are ductile fractured.

A comparison of Example 16 according to the invention with Comparison Example 15 shows that, when the carbon black/demoulding agent masterbatch is used, the notched impact strength is markedly higher and the transition from ductile to brittle fracture behaviour occurs at lower temperatures than when the carbon black powder is used. This indicates better dispersion of the carbon black when the carbon black/demoulding agent masterbatch is used, even though the specific mechanical energy input (SME) has remained almost the same.

Example 17

Comparison

An elastomer-containing polycarbonate blend having a melt volume flow rate (MVR) of 27 $cm^3$/10 min (measured according to ISO 1133 at 260° C. and 5 kg) was prepared according to formulation 17 (see Table 1) using test arrangement 7. B16 (carbon black/polyethylene masterbatch Plasblak PE6130 (50% carbon black) from Cabot) according to Table 1 was added as the carbon black component.

For the preparation of the compound, a premix was first prepared from components b (carbon black component), c (demoulding agent), g (additives) and f3 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 17.

Example 18

Comparison

An elastomer-containing polycarbonate blend having a melt volume flow rate (MVR) of 27 $cm^3$/10 min (measured according to ISO 1133 at 260° C. and 5 kg) was prepared according to formulation 16 (see Table 1) using test arrangement 7. The carbon black/polycarbonate masterbatch B15 (PC Black 91024 (15% carbon black) from Color Systems) according to Table 1 was added as the carbon black component.

For the preparation of the compound, a premix was first prepared from components b (carbon black component), c (demoulding agent) and g (additives) and also a9 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 18.

Example 19

According to the Invention

An elastomer-containing polycarbonate blend having a melt volume flow rate (MVR) of 27 $cm^3$/10 min (measured according to ISO 1133 at 260° C. and 5 kg) was prepared according to formulation 4 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component), g (additives) and f3 given in Table 1 in the mentioned amounts. Preparation of the premix and compounding of the moulding composition were carried out as described in Example 1.

The process parameters of the extruder and the number; measured as described above, of surface defects, based on one square centimeter, are listed in Table 4 under Example 19.

A comparison of Example 19 according to the invention with Comparison Examples 17 and 18 shows that, when the carbon black/demoulding agent masterbatch is used, the number of surface defects is markedly smaller than when masterbatches based on polyethylene (B16) or polycarbonate (B15) are used. Both these findings indicate better dispersion of the carbon black when the carbon black/demoulding agent masterbatch is used, even though the specific mechanical energy input (SME) has remained almost the same.

Example 20

Comparison

An elastomer- and polyester-containing polycarbonate blend having a melt volume flow rate (MVR) of 12 $cm^3$/10 min (measured according to ISO 1133 at 260° C. and 5 kg) was prepared according to formulation 32 (Table 1) using test arrangement 10. Carbon black powder according to Table 1 was added as the carbon black component.

For the preparation of the compound, a premix was first prepared from components b (carbon black component), c (demoulding agent) and g (additives) and also a8 given in Table 1 in the mentioned amounts. Mixing of the premix was carried out in a container mixer from Mixaco (type CM1000 with MB tool) for 4.5 minutes at a speed of 425 l/min and a degree of filling of the mixer of 80%.

The premix and the remaining mixture constituents listed in Table 1 were then metered separately from one another, in each case by means of a differential proportioning weigher (not shown), via the feed hopper 8d into the main intake into housing 9d of the extruder.

In the plastification zone in the region of housings 12d, 23a and 13d, the meltable mixture constituents were melted and all the mixture constituents were dispersed. In the mixing zone in the region of housings 14d, 24a and 18d, the mixture constituents were intimately mixed and the melt mixture was homogenised. The melt mixture was degassed in the penultimate housing part 8d.

The melt strands emerging from the nozzle plate were cooled in a water bath and then granulated by means of a strand granulator.

The process parameters of the extruder and the number, measured as described above, of surface defects, based on one square centimeter, are listed in Table 4 under Example 20.

Example 21

Comparison

An elastomer- and polyester-containing polycarbonate blend having a melt volume flow rate (MVR) of 12 $cm^3$/10 min (measured according to ISO 1133 at 260° C. and 5 kg) was prepared according to formulation 33 (Table 1) using test arrangement 10. B86 (carbon black/polyethylene masterbatch Plasblak PE6130 (50% carbon black) from Cabot) according to Table 1 was added as the carbon black component.

For the preparation of the compound, a premix was first prepared from components b (carbon black component), c (demoulding agent) and g (additives) and also a8 given in Table 1 in the mentioned amounts. Preparation of the premix and compounding of the moulding composition were carried out as described in Example 20.

The process parameters of the extruder as well as the number, measured as described above, of surface defects, based on one square centimeter, are listed in Table 4 under Example 21.

Example 22

According to the Invention

An elastomer-containing polycarbonate blend having a melt volume flow rate (MVR) of 12 $cm^3$/10 min (measured according to ISO 1133 at 260° C. and 5 kg) was prepared according to formulation 34 (see Table 1) using test arrangement 10. Carbon black/demoulding agent masterbatch granules according to Table 1, which were prepared as described under A.2, were added as the carbon black component.

For the preparation of the compound, a premix was first prepared from components b (carbon black component), c (demoulding agent) and g (additives) and also a8 given in Table 1 in the mentioned amounts. Preparation of the premix and compounding of the moulding composition were carried out as described in Example 20.

The process parameters of the extruder and the number, measured as described above, of surface defects, based on one square centimeter, are listed in Table 4 under Example 22.

A comparison of Example 22 according to the invention with Comparison Examples 20 and 21 shows that, for elastomer- and polyester-containing polycarbonate blends too, the number of surface defects is markedly smaller when the carbon black/demoulding agent masterbatch is used than when carbon black powder and a carbon black/polyethylene masterbatch according to the prior art are used. Both these findings indicate better dispersion of the carbon black when the carbon black/demoulding agent masterbatch is used, even though the specific mechanical energy input (SME) has remained almost the same.

At the same time it is shown that, even with an extruder having a larger screw outside diameter (133 mm), the number of surface defects is markedly smaller when the carbon black/demoulding agent masterbatch is used than when carbon black powder or carbon black masterbatch according to the prior art is used.

Example 23

Comparison

A polycarbonate compound having a melt volume flow rate (MVR) of 19 $cm^3$/10 min (measured according to ISO 1133 at 300° C. and 1.2 kg) was prepared according to formulation 26 (see Table 1) using test arrangement 11. Carbon black powder according to Table 1 was added as the carbon black component.

For the preparation of the compound, a premix was first prepared from components b (carbon black component), c (demoulding agent) and g (additives) and also a8 given in Table 1 in the mentioned amounts. Mixing of the premix was carried out in a container mixer from Mixaco (type CM1000 with MB tool). Components b, g and a8 were first introduced into the mixing container and mixed for 2 minutes at a speed of 250 l/min and a degree of filling of the mixer of 80%. Component c was then added to the premixed components in the mixing container and mixed for 1.5 minutes at a speed of 350 l/min.

The premix and the remaining mixture constituents listed in Table 1 were then metered separately from one another, in each case by means of a differential proportioning weigher (not shown), via the feed hopper 8e into the main intake into housing 9e of the extruder.

In the plastification zone and the mixing zone in the region of housings 13e and 14e, the meltable mixture constituents were melted and all the mixture constituents were dispersed. In housing 18e, the melt was degassed. In housing 21a, liquid g1 (flameproofing agent) was injected into the melt via an injection nozzle 22a and intimately mixed with the melt in the subsequent mixing zone in the region of housings 21a, 26 and 19e, and the melt mixture was homogenised.

The melt strands emerging from the nozzle plate were cooled in a water bath and then granulated by means of a strand granulator.

The process parameters of the extruder and the number, measured as described above, of surface defects, based on one square centimeter, are listed in Table 4 under Example 23.

Example 24

According to the Invention

A polycarbonate compound having a melt volume flow rate (MVR) of 19 $cm^3$/10 min (measured according to ISO 1133 at 30° C. and 1.2 kg) was prepared according to formulation 27 (see Table 1) using test arrangement 11. Carbon black/demoulding agent masterbatch granules according to Table 1, which were prepared as described under A.2, were added as the carbon black component.

For the preparation of the compound, a premix was first prepared from components b (carbon black component), c (demoulding agent) and also a8 given in Table 1 in the mentioned amounts. Mixing of the premix was carried out in a container mixer from Mixaco (type CM1000 with MB tool). Components b, g and a8 were first introduced into the mixing container and mixed for 2 minutes at a speed of 250 l/min and a degree of filling of the mixer of 80%. Component c was then added to the premixed components in the mixing container and mixed for 1.5 minutes at a speed of 350 l/min.

Compounding of the moulding composition was carried out as described in Example 23.

The process parameters of the extruder and the number, measured as described above, of surface defects, based on one square centimeter, are listed in Table 4 under Example 24.

A comparison of Example 24 according to the invention with Comparison Example 23 shows that, when the carbon black/demoulding agent masterbatch is used, the number of surface defects is markedly smaller than when the carbon black powder is used. Both these findings indicate better dispersion of the carbon black when the carbon black/demoulding agent masterbatch is used, even though the specific mechanical energy input (SME) was higher in Example 23 than in Example 24.

At the same time it is shown that, for a polycarbonate compound too, in an extruder having a larger screw outside diameter (92 mm), the number of surface defects is markedly smaller when the carbon black/demoulding agent masterbatch is used than when carbon black powder is used.

Example 25

According to the Invention

An elastomer-containing polycarbonate blend having a melt volume flow rate (MVR) of 27 $cm^3$/10 min (measured according to ISO 1133 at 260° C. and 5 kg) was prepared according to formulation 10 (see Table 1) using test arrangement 7. Carbon black/demoulding agent masterbatch granules containing 40 wt. % carbon black according to Table 1, which were prepared as described under A.2, were added as the carbon black component.

For the preparation of the compound, a premix was first prepared from components b (carbon black component), g (additives) and f3 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 25.

Example 26

According to the Invention

An elastomer-containing polycarbonate blend having a melt volume flow rate (MVR) of 27 $cm^3$/10 min (measured according to ISO 1133 at 260° C. and 5 kg) was prepared according to formulation 12 (see Table 1) using test arrangement 7. Carbon black/demoulding agent masterbatch granules containing 45 wt. % carbon black according to Table 1, which were prepared as described under A.2, were added as the carbon black component.

The procedure in the preparation of the polycarbonate blend corresponded to that of Example 25.

The process parameters of the extruder and the number, measured as described above, of surface defects, based on one square centimeter, are listed in Table 4 under Example 26.

Example 27

An elastomer-containing polycarbonate blend having a melt volume flow rate (MVR) of 27 $cm^3$/10 min (measured according to ISO 1133 at 260° C. and 5 kg) was prepared according to formulation 9 (see Table 1) using test arrangement 7. Carbon black/demoulding agent masterbatch granules containing 50 wt. % carbon black according to Table 1, which were prepared as described under A.2, were added as the carbon black component.

The procedure in the preparation of the polycarbonate blend corresponded to that of Example 25.

The process parameters of the extruder and the number, measured as described above, of surface defects, based on one square centimeter, are listed in Table 4 under Example 27.

Example 28

According to the Invention

An elastomer-containing polycarbonate blend having a melt volume flow rate (MVR) of 27 $cm^3$/10 min (measured according to ISO 1133 at 260° C. and 5 kg) was prepared according to formulation 6 (see Table 1) using test arrangement 7. Carbon black/demoulding agent masterbatch granules containing 58 wt. % carbon black according to Table 1, which were prepared as described under A.2, were added as the carbon black component.

The procedure in the preparation of the polycarbonate blend corresponded to that of Example 25.

The process parameters of the extruder and the number, measured as described above, of surface defects, based on one square centimeter, are listed in Table 4 under Example 28.

Example 29

According to the Invention

An elastomer-containing polycarbonate blend having a melt volume flow rate (MVR) of 27 $cm^3$/10 min (measured according to ISO 1133 at 260° C. and 5 kg) was prepared according to formulation 11 (see Table 1) using test arrangement 7. Carbon black/demoulding agent masterbatch granules containing 60 wt. % carbon black according to Table 1, which were prepared as described under A.2, were added as the carbon black component.

The procedure in the preparation of the polycarbonate blend corresponded to that of Example 25.

The process parameters of the extruder and the number, measured as described above, of surface defects, based on one square centimeter, are listed in Table 4 under Example 29.

Example 30

According to the Invention

An elastomer-containing polycarbonate blend having a melt volume flow rate (MVR) of 27 $cm^3$/10 min (measured according to ISO 1133 at 260° C. and 5 kg) was prepared according to formulation 8 (see Table 1) using test arrangement 7. Carbon black/demoulding agent masterbatch granules containing 65 wt. % carbon black according to Table 1, which were prepared as described under A.2, were added as the carbon black component.

The procedure in the preparation of the polycarbonate blend corresponded to that of Example 25.

The process parameters of the extruder and the number, measured as described above, of surface defects, based on one square centimeter, are listed in Table 4 under Example 30.

A comparison of Examples 25 to 30 according to the invention with Comparison Example 1 shows that, even when carbon black/demoulding agent masterbatches having carbon black contents varying from 40 wt. % to 65 wt. % are used, the number of surface defects is markedly lower than when carbon black powder is used. With a carbon black content of 65 wt. % in the masterbatch (Example 30), however, the number of surface defects is higher than with 40 wt. % to 60 wt. %, so that 65 wt. % represents the upper carbon black concentration for good dispersion.

In tests with carbon black concentrations less than 40 wt. %, it was not possible to form a strand because the carbon black-demoulding agent composition had too low a viscosity and was tacky. In the tests, therefore, a carbon black concentration of 40 wt. % represented the lower carbon black concentration which could still be processed without problems.

Example 31

According to the Invention

An elastomer-containing polycarbonate blend having a melt volume flow rate (MVR) of 27 $cm^3$/10 min (measured according to ISO 1133 at 260° C. and 5 kg) was prepared according to formulation 7 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component), g (additives) and f3 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 31.

A comparison of Examples 2, 27 and 31 according to the invention with Comparison Example 1 shows that, when carbon black/demoulding agent masterbatches produced either using a co-kneader or using a twin-screw extruder or using shear rollers are used, the number of surface defects is markedly smaller than when carbon black powder is used.

Example 32

According to the Invention

An elastomer-containing polycarbonate blend having a melt volume flow rate (MVR) of 27 $cm^3$/10 min (measured according to ISO 1133 at 260° C. and 5 kg) was prepared according to formulation 13 (see Table 1) using test arrangement 7. For the preparation of the compound, a premix was first prepared from components b (carbon black component), g (additives) and f3 given in Table 1 in the mentioned amounts. Preparation of the premix and compounding of the moulding composition were carried out as described in Example 1.

The process parameters of the extruder and the number, measured as described above, of surface defects, based on one square centimeter, are listed in Table 4 under Example 32.

Example 33

According to the Invention

An elastomer-containing polycarbonate blend having a melt volume flow rate (MVR) of 27 $cm^3$/10 min (measured according to ISO 1133 at 260° C. and 5 kg) was prepared according to formulation 14 (see Table 1) using test arrangement 7. The procedure in the preparation of the polycarbonate blend corresponded to that of Example 32.

The process parameters of the extruder and the number, measured as described above, of surface defects, based on one square centimeter, are listed in Table 4 under Example 33.

Example 34

According to the Invention

An elastomer-containing polycarbonate blend having a melt volume flow rate (MVR) of 27 $cm^3$/10 min (measured according to ISO 1133 at 260° C. and 5 kg) was prepared according to formulation 15 (see Table 1) using test arrangement 7. The procedure in the preparation of the polycarbonate blend corresponded to that of Example 32.

The process parameters of the extruder and the number, measured as described above, of surface defects, based on one square centimeter, are listed in Table 4 under Example 34.

A comparison of Examples 27, 32, 33 and 34 according to the invention with Comparison Example 1 shows that, with c1 or c3 or c4 in the carbon black/demoulding agent masterbatch, when the carbon black/demoulding agent masterbatch so prepared is used, the number of surface defects is markedly smaller than with carbon black powder. Although with c2 in the carbon black/demoulding agent masterbatch, the number of surface defects is larger when the carbon black/demoulding agent masterbatch so prepared is used than with c1, c3 or c4, it is still markedly smaller than with carbon black powder.

Example 35

According to the Invention

An elastomer-containing polycarbonate blend having a melt volume flow rate (MVR) of 27 $cm^3$/10 min (measured according to ISO 1133 at 260° C. and 5 kg) was prepared according to formulation 5 (see Table 1) using test arrangement 7. For the preparation of the compound, a premix was first prepared from components b (carbon black component), g (additives) and f3 given in Table 1 in the mentioned amounts. Preparation of the premix and compounding of the moulding composition were carried out as described in Example 1.

The process parameters of the extruder and the number, measured as described above, of surface defects, based on one square centimeter, and the measured notched impact strength according to ISO 180/1A are listed in Table 4 under Example 35.

A comparison of Examples 2 and 35 according to the invention with Comparison Example 1 shows that, with both b2 and b1 as carbon black in the carbon black/demoulding agent masterbatch, when the carbon black/demoulding agent masterbatch so prepared is used, the number of surface defects is markedly smaller and the notched impact strength at 23° C. and at 0° C. is markedly higher than with carbon black powder.

Example 36

According to the Invention

An elastomer-containing polycarbonate blend having a melt volume flow rate (MVR) of 27 $cm^3$/10 min (measured according to ISO 1133 at 260° C. and 5 kg) was prepared according to formulation 3 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component), g (additives) and f3 given in Table 1 in the mentioned amounts. Preparation of the premix and compounding of the moulding composition were carried out as described in Example 1.

The process parameters of the extruder and the number, measured as described above, of surface defects, based on one square centimeter, and the measured notched impact strength according to ISO 180/1A are listed in Table 4 under Example 36.

Example 37

According to the Invention

An elastomer-containing polycarbonate blend having a melt volume flow rate (MVR) of 27 $cm^3$/10 min (measured according to ISO 1133 at 260° C. and 5 kg) was prepared according to formulation 2 (see Table 1) using test arrangement 7. Carbon black/demoulding agent masterbatch granules according to Table 1, which were prepared as described under A.2, were added as the carbon black component.

For the preparation of the compound, a premix was first prepared from components b (carbon black component), g (additives) and f3 given in Table 1 in the mentioned amounts. Preparation of the premix and compounding of the moulding composition were carried out as described in Example 1.

The process parameters of the extruder and the number, measured as described above, of surface defects, based on one square centimeter, and the measured notched impact strength according to ISO 180/1A are listed in Table 4 under Example 37.

A comparison of Examples 2, 36 and 37 according to the invention with Comparison Example 1 shows that, when the carbon black/demoulding agent masterbatches prepared in a co-kneader with different process parameters and test arrangements are used, the number of surface defects is markedly smaller and the notched impact strength at 23° C. and at 0° C. is markedly higher than when the carbon black powder is used.

TABLE 1

(all amounts in wt. %)

| 95<br>all amounts in wt % | 1<br>Comp. | 2<br>Invention | 3<br>Invention | 4<br>Invention | 5<br>Invention | 6<br>Invention | 7<br>Invention | 8<br>Invention |
|---|---|---|---|---|---|---|---|---|
| a | | | | | | | | |
| a1 | 14.14 | | | | | | | |
| a2 | 42.1 | 73.3 | 73.3 | 73.3 | 73.3 | 73.34 | 73.3 | 73.3 |
| a3 | | | | | | | | |
| a4 | | | | | | | | |
| a5 | | | | | | | | |
| a6 | | | | | | | | |
| a7 | | | | | | | | |
| a8 | | | | | | | | |
| a9 | 16.9 | | | | | | | |
| B | | | | | | | | |
| B1 | | 1.49 | | | | | | |
| B2 | | | 1.49 | | | | | |
| B3 | | | | 1.49 | | | | |
| B4 | | | | | 1.49 | | | |
| B5 | | | | | | 1.29 | | |
| B6 | | | | | | | 1.49 | |
| B7 | | | | | | | | 1.15 |
| B8 | | | | | | | | |
| B9 | | | | | | | | |
| B10 | | | | | | | | |
| B11 | | | | | | | | |
| B12 | | | | | | | | |
| B13 | | | | | | | | |
| B14 | | | | | | | | |
| B15 | | | | | | | | |
| B16 | | | | | | | | |
| b1 | 0.75 | | | | | | | |
| b3 | | | | | | | | |
| b4 | | | | | | | | |
| c | | | | | | | | |
| c1 | 0.73 | | | | | 0.16 | | 0.34 |

TABLE 1-continued (all amounts in wt. %)

| | | | | | | | | |
|---|---|---|---|---|---|---|---|---|
| d | | | | | | | | |
| d1 | | | | | | | | |
| d2 | | | | | | | | |
| f | | | | | | | | |
| f1 | | | | | | | | |
| f2 | | | | | | | | |
| f3 | 6.89 | 6.8 | 6.8 | 6.8 | 6.8 | 6.8 | 6.8 | 6.8 |
| f4 | | | | | | | | |
| f5 | | | | | | | | |
| f6 | | | | | | | | |
| f7 | 17.6 | 17.52 | 17.52 | 17.52 | 17.52 | 17.52 | 17.52 | 17.52 |
| g | | | | | | | | |
| g1 | | | | | | | | |
| g2 | | | | | | | | |
| g3 | 0.89 | 0.89 | 0.89 | 0.89 | 0.89 | 0.89 | 0.89 | 0.89 |
| g4 | | | | | | | | |
| g5 | | | | | | | | |

| | Formulation | | | | | | | | |
|---|---|---|---|---|---|---|---|---|---|
| Component all amounts in wt % | 9 Invention | 10 Invention | 11 Invention | 12 Invention | 13 Invention | 14 Invention | 15 Invention | 16 Comp. | 17 Comp. |
| a | | | | | | | | | |
| a1 | | | | | | | | | |
| a2 | 73.3 | 73.21 | 73.34 | 73.44 | 73.21 | 73.21 | 73.21 | 62.58 | 73.3 |
| a3 | | | | | | | | | |
| a4 | | | | | | | | | |
| a5 | | | | | | | | | |
| a6 | | | | | | | | | |
| a7 | | | | | | | | | |
| a8 | | | | | | | | | |
| a9 | | | | | | | | 4.92 | |
| B | | | | | | | | | |
| B1 | | | | | | | | | |
| B2 | | | | | | | | | |
| B3 | | | | | | | | | |
| B4 | | | | | | | | | |
| B5 | | | | | | | | | |
| B6 | | | | | | | | | |
| B7 | | | | | | | | | |
| B8 | 1.49 | | | | | | | | |
| B9 | | 1.9 | | | | | | | |
| B10 | | | 1.25 | | | | | | |
| B11 | | | | 1.67 | | | | | |
| B12 | | | | | 1.9 | | | | |
| B13 | | | | | | 1.9 | | | |
| B14 | | | | | | | 1.9 | | |
| B15 | | | | | | | | 6.53 | |
| B16 | | | | | | | | | 1.94 |
| b1 | | | | | | | | | |
| b3 | | | | | | | | | |
| b4 | | | | | | | | | |
| c | | | | | | | | | |
| c1 | | | 0.2 | | | | | 0.73 | 0.72 |
| d | | | | | | | | | |
| d1 | | | | | | | | | |
| d2 | | | | | | | | | |
| f | | | | | | | | | |
| f1 | | | | | | | | | |
| f2 | | | | | | | | | |
| f3 | 6.8 | 6.8 | 6.8 | 6.8 | 6.8 | 6.8 | 6.8 | 6.82 | 6.15 |
| f4 | | | | | | | | | |
| f5 | | | | | | | | | |
| f6 | | | | | | | | | |
| f7 | 17.52 | 17.2 | 17.52 | 17.2 | 17.2 | 17.2 | 17.2 | 17.54 | 17 |

TABLE 1-continued (all amounts in wt. %)

| | | | | | | | | | |
|---|---|---|---|---|---|---|---|---|---|
| g | | | | | | | | | |
| g1 | | | | | | | | | |
| g2 | | | | | | | | | |
| g3 | 0.89 | 0.89 | 0.89 | 0.89 | 0.89 | 0.89 | 0.89 | 0.88 | 0.89 |
| g4 | | | | | | | | | |
| g5 | | | | | | | | | |

| | Formulation | | | | | | | |
|---|---|---|---|---|---|---|---|---|
| Component all amount in wt % | 18 Comp. | 19 acc. to inv. | 20 Comp. | 21 acc. to inv. | 22 Comp. | 23 acc. to inv. | 24 Comp. | 25 acc. to inv. |
| a | | | | | | | | |
| a1 | | | 22 | 21.9 | | | | |
| a2 | | | 42.2 | 42.2 | | | | |
| a3 | 59.89 | 59.89 | | | | | | |
| a4 | | | | | 95 | 95 | | |
| a5 | | | | | | | 95 | 95 |
| a6 | | | | | | | | |
| a7 | | | | | | | | |
| a8 | | | | | | | | |
| a9 | | | | | 4.44 | 4.44 | 4.44 | 4.44 |
| B | | | | | | | | |
| B1 | | | | | | | | |
| B2 | | | | | | | | |
| B3 | | 1.5 | | 1 | | 0.32 | | |
| B4 | | | | | | | | |
| B5 | | | | | | | | 0.28 |
| B6 | | | | | | | | |
| B7 | | | | | | | | |
| B8 | | | | | | | | |
| B9 | | | | | | | | |
| B10 | | | | | | | | |
| B11 | | | | | | | | |
| B12 | | | | | | | | |
| B13 | | | | | | | | |
| B14 | | | | | | | | |
| B15 | | | | | | | | |
| B16 | | | | | | | | |
| b1 | 0.75 | | 0.5 | | 0.16 | | 0.16 | |
| b3 | | | | | | | | |
| b4 | | | | | | | | |
| c | | | | | | | | |
| c1 | 0.75 | | 0.4 | | 0.4 | 0.24 | 0.4 | 0.28 |
| d | | | | | | | | |
| d1 | | | | | | | | |
| d2 | | | | | | | | |
| f | | | | | | | | |
| f1 | 17.1 | 17.1 | | | | | | |
| f2 | 8.84 | 8.84 | 15.8 | 15.8 | | | | |
| f3 | | | | | | | | |
| f4 | 2.95 | 2.95 | 3 | 3 | | | | |
| f5 | | | | | | | | |
| f6 | | | | | | | | |
| f7 | 9.4 | 9.4 | | | | | | |
| g | | | | | | | | |
| g1 | | | 14.9 | 14.9 | | | | |
| g2 | | | 0.8 | 0.8 | | | | |
| g3 | 0.32 | 0.32 | 0.4 | 0.4 | 0 | 0 | 0 | 0 |
| g4 | | | | | | | | |
| g5 | | | | | | | | |

| | Formulation | | | | | |
|---|---|---|---|---|---|---|
| Component all amount in wt % | 26 Comp. | 27 acc. to inv. | 28 Comp. | 29 acc. to inv. | 30 Comp. | 31 acc. to inv. |
| a | | | | | | |
| a1 | | 36 | | | | |
| a2 | 95.6 | | | | | |

TABLE 1-continued (all amounts in wt. %)

| | | | | | | |
|---|---|---|---|---|---|---|
| a3 | | 62.4 | | | | |
| a4 | | | | | | |
| a5 | | | | | | |
| a6 | | | 95 | 95 | | |
| a7 | | | | | 95 | 95 |
| a8 | 3.82 | 1.04 | | | | |
| a9 | | | 4.54 | 4.54 | 4.84 | 4.72 |
| B | | | | | | |
| B1 | | | | | | |
| B2 | | | | | | |
| B3 | | | | | | |
| B4 | | | | | | |
| B5 | | 0.28 | | 0.28 | | 0.28 |
| B6 | | | | | | |
| B7 | | | | | | |
| B8 | | | | | | |
| B9 | | | | | | |
| B10 | | | | | | |
| B11 | | | | | | |
| B12 | | | | | | |
| B13 | | | | | | |
| B14 | | | | | | |
| B15 | | | | | | |
| B16 | | | | | | |
| b1 | 0.16 | | 0.16 | | 0.16 | |
| b3 | | | | | | |
| b4 | | | | | | |
| c | | | | | | |
| c1 | 0.4 | 0.28 | 0.3 | 0.18 | | |
| d | | | | | | |
| d1 | | | | | | |
| d2 | | | | | | |
| f | | | | | | |
| f1 | | | | | | |
| f2 | | | | | | |
| f3 | | | | | | |
| f4 | | | | | | |
| f5 | | | | | | |
| f6 | | | | | | |
| f7 | | | | | | |
| g | | | | | | |
| g1 | | | | | | |
| g2 | | | | | | |
| g3 | 0.02 | 0 | 0 | 0 | 0 | 0 |
| g4 | | | | | | |
| g5 | | | | | | |

| | Formulation | | | | |
|---|---|---|---|---|---|
| Component all amount in wt % | 32 Comp. | 33 Comp. | 34 acc. to inv. | 35 Comp. | 36 acc. to inv. |
| a | | | | | |
| a1 | | | | | |
| a2 | 48.61 | 48.76 | 48.47 | | |
| a3 | | | | 74.19 | 75.11 |
| a4 | | | | | |
| a5 | | | | | |
| a6 | | | | | |
| a7 | | | | | |
| a8 | 1.04 | 0.94 | 1.03 | | |
| a9 | | | | | |
| B | | | | | |
| B1 | | | | | |
| B2 | | | | | |
| B3 | | | | | 1.8 |
| B4 | | | | | |
| B5 | | | 0.51 | | |
| B6 | | | | | |
| B7 | | | | | |
| B8 | | | | | |

TABLE 1-continued (all amounts in wt. %)

| | | | | | |
|---|---|---|---|---|---|
| B9 | | | | | |
| B10 | | | | | |
| B11 | | | | | |
| B12 | | | | | |
| B13 | | | | | |
| B14 | | | | | |
| B15 | | | | | |
| B16 | | 0.59 | | | |
| b1 | 0.3 | | | 0.9 | |
| b3 | | | | 0.25 | 0.25 |
| b4 | | | | 0.057 | 0.057 |
| c | | | | | |
| c1 | 0.4 | 0.2 | 0.18 | 0.73 | |
| d | | | | | |
| d1 | 31.84 | 31.75 | 31.75 | | |
| d2 | 0.561 | 0.5525 | 0.765 | | |
| f | | | | | |
| f1 | | | | | |
| f2 | | | | | |
| f3 | | | | | |
| f4 | | | | | |
| f5 | 14.95 | 14.91 | 14.95 | | |
| f6 | | | | 8.77 | 8.75 |
| f7 | | | | 13.21 | 13.14 |
| g | | | | | |
| g1 | | | | | |
| g2 | | | | | |
| g3 | 0.299 | 0.2975 | 0.347 | 0.89 | 0.89 |
| g4 | 2 | 2 | 2 | | |
| g5 | | | | 1 | |

TABLE 2

| Carbon black/ demoulding agent master-batch no. | Test arrange-ment | Formula-tion | Carbon black metering site | Through-put kg/h | Speed min−1 | Power kW | SME kWh/kg | Heating temperatures: 1st housing half co-kneader ° C. | 2nd housing half co-kneader ° C. | Housing single-shaft extruder ° C. | Nozzle head ° C. | Co-kneader shaft ° C. |
|---|---|---|---|---|---|---|---|---|---|---|---|---|
| B1 | 1 | 50% b1<br>50% c1 | Feed hopper 1 | 9 | 190 | 3.4 | 0.378 | 30 | 30 | 40 | 95 | 30 |
| B2 | 2 | 50% b1<br>50% c1 | Feed hopper 1 | 12 | 190 | 3.3 | 0.275 | 90 | 60 | 35 | 130 | 35 |
| B3 | 3 | 50% b1<br>50% c1 | Feed hopper 1: 32%<br>Feed hopper 7: 18% | 20 | 250 | 3.8 | 0.190 | 60 | 35 | 75 | 110 | 35 |
| B4 | 3 | 50% b2<br>50% c1 | Feed hopper 1: 20%<br>Feed hopper 7: 30% | 12 | 250 | 2.3 | 0.192 | 60 | 35 | 75 | 110 | 35 |

TABLE 3

| Carbon black/ demoulding agent master-batch no. | Test arrange-ment | Formula-tion | Carbon black metering site | Through-put kg/h | Speed $min^{-1}$ | Spec. power kWh/kg | Heating temperatures of the housing parts: 9 ° C. | 10 ° C. | 11 ° C. |
|---|---|---|---|---|---|---|---|---|---|
| B8 | 4 | 50% b1<br>50% c1 | Feed hopper 8: 25%<br>Housing part 15: 25% | 25 | 200 | 0.084 | 30 | 60 | 65 |
| B9 | 4 | 40% b1<br>60% c1 | Feed hopper 8: 10%<br>Housing part 15: 30% | 25 | 300 | 0.0096 | 30 | 60 | 65 |
| B10 | 4 | 60% b1<br>40% c1 | Feed hopper 8: 15%<br>Housing part 15: 45% | 25 | 200 | 0.248 | 30 | 60 | 65 |
| B11 | 4 | 45% b1<br>55% c1 | Feed hopper 8: 10%<br>Housing part 15: 35% | 25 | 300 | 0.037 | 30 | 60 | 65 |
| B12 | 4 | 40% b1<br>60% c3 | Feed hopper 8: 20%<br>Housing part 15: 20% | 25 | 200 | 0.032 | 30 | 60 | 65 |

TABLE 3-continued

| | | | | | | | | | |
|---|---|---|---|---|---|---|---|---|---|
| B13 | 4 | 40% b1<br>60% c2 | Feed hopper 8: 20%<br>Housing part 15: 20% | 25 | 200 | 0.073 | 30 | 60 | 65 |
| B14 | 4 | 40% b1<br>60% c4 | Feed hopper 8: 20%<br>Housing part 15: 20% | 25 | 200 | 0.073 | 30 | 60 | 65 |

| | Heating temperatures of the housing parts: | | | | | | | | |
|---|---|---|---|---|---|---|---|---|---|
| Carbon black/ demoulding agent master-batch no. | 12 ° C. | 13 ° C. | 14 ° C. | 15 ° C. | 16 ° C. | 17 ° C. | 18 ° C. | 19 °C. | Nozzle (not shown) ° C. |
| B8 | 65 | 65 | 65 | 70 | 50 | 50 | 50 | 35 | 110 |
| B9 | 65 | 65 | 65 | 70 | 50 | 50 | 50 | 35 | 110 |
| B10 | 65 | 65 | 65 | 70 | 50 | 50 | 50 | 35 | 130 |
| B11 | 65 | 65 | 65 | 70 | 50 | 50 | 50 | 35 | 110 |
| B12 | 65 | 65 | 65 | 70 | 50 | 50 | 50 | 35 | 110 |
| B13 | 65 | 65 | 65 | 70 | 50 | 50 | 50 | 35 | 130 |
| B14 | 65 | 65 | 65 | 70 | 50 | 50 | 50 | 35 | 115 |

TABLE 4

| Example | Formula-tion | Test arrange-ment | Through-put kg/h | Speed 1/min | SME kWh/kg | Surface defects per $cm^2$ Mean of 3 sheets | Notched impact strength at 23° C. $kJ/m^2$ | Notched impact strength at 0° C. $kJ/m^2$ |
|---|---|---|---|---|---|---|---|---|
| 1 Comparison | 1 | 7 | 103 | 400 | 0.129 | 199 | 46.9 | 13.75 |
| 2 Invention | 4 | 7 | 97 | 400 | 0.137 | 19 | 50.94 | 15.09 |
| 3 Comparison | 18 | 7 | 92 | 400 | 0.145 | 53 | | |
| 4 Invention | 19 | 7 | 92 | 400 | 0.145 | 24 | | |
| 5 Comparison | 20 | 8 | 99 | 600 | 0.145 | 17 | 12.77 | |
| 6 Invention | 21 | 8 | 98 | 600 | 0.147 | 11 | 13.06 | |
| 7 Comparison | 22 | 7 | 62 | 350 | 0.188 | 12 | | |
| 8 Invention | 23 | 7 | 64 | 350 | 0.182 | 9 | | |
| 9 Comparison | 24 | 7 | 62 | 350 | 0.188 | 5 | | |
| 10 Invention | 25 | 7 | 62 | 350 | 0.188 | 4 | | |
| 11 Comparison | 28 | 7 | 52 | 350 | 0.224 | 257 | | |
| 12 Invention | 29 | 7 | 52 | 350 | 0.224 | 34 | | |
| 13 Comparison | 30 | 7 | 58 | 350 | 0.201 | 60 | | |
| 14 Invention | 31 | 7 | 57 | 350 | 0.204 | 31 | | |
| 15 Comparison | 35 | 9 | 20 | 400 | 0.247 | | | |
| 16 Invention | 36 | 9 | 20 | 400 | 0.24 | | | |
| 17 Comparison | 17 | 7 | 73 | 400 | 0.131 | 34 | | |
| 18 Comparison | 16 | 7 | 73 | 400 | 0.131 | 63 | | |
| 19 Invention | 4 | 7 | 75 | 400 | 0.133 | 18 | | |
| 20 Comparison | 32 | 10 | 3100 | 187 | 0.131 | 2191 | | |
| 21 Comparison | 33 | 10 | 3091 | 175 | 0.124 | 1122 | | |
| 22 Invention | 34 | 10 | 3092 | 188 | 0.131 | 446 | | |
| 23 Comparison | 26 | 11 | 2975 | 493 | 0.141 | 247 | | |
| 24 Invention | 27 | 11 | 3003 | 485 | 0.132 | 11 | | |
| 25 Invention | 10 | 7 | 95 | 400 | 0.14 | 6 | | |
| 26 Invention | 12 | 7 | 95 | 400 | 0.14 | 6 | | |
| 27 Invention | 9 | 7 | 90 | 400 | 0.148 | 10 | | |
| 28 Invention | 6 | 7 | 95 | 400 | 0.14 | 5 | | |
| 29 Invention | 11 | 7 | 95 | 400 | 0.14 | 5 | | |
| 30 Invention | 8 | 7 | 90 | 400 | 0.148 | 21 | | |
| 31 Invention | 7 | 7 | 90 | 400 | 0.148 | 11 | | |
| 32 Invention | 13 | 7 | 90 | 400 | 0.148 | 7 | | |
| 33 Invention | 14 | 7 | 95 | 400 | 0.14 | 48 | | |
| 34 Invention | 15 | 7 | 95 | 400 | 0.14 | 6 | | |
| 35 Invention | 5 | 7 | 97 | 400 | 0.137 | 23 | 56.2 | 19.22 |
| 36 Invention | 3 | 7 | 97 | 400 | 0.137 | 19 | 48.3 | 16.16 |
| 37 Invention | 2 | 7 | 97 | 400 | 0.137 | 17 | 52.73 | 15.93 |

The invention claimed is:

1. An injection molded article produced by a process comprising [preparing] *injection molding* a coloured polymer composition [by melt-mixing], *wherein the coloured polymer composition comprises a melt-mixed coloured polycarbonate composition, comprising:*

*a) from 40 to 99.96 wt. % of at least one thermoplastic polymer (a), wherein polymer (a) is at least one selected from the group consisting of aromatic polycarbonates and aromatic polyester carbonates, wherein the polymer (a) has a weight average molecular weight of 15,000 to 80,000 g/mol, and wherein the polymer (a) is a homopolycarbonate or copolycarbonate containing bisphenol A;*

*b) from 0.1 to 3 wt. % of at least one pigment component (b);*

*c) from 0.1 to 3 wt. % of at least one demoulding agent (c) selected from the group consisting of pentaerythritol tetrastearate, glycerol monostearate, and stearyl stearate;*

*d) from 0 to 60 wt. % of one or more thermoplastic polyesters (d);*

*e) from 0 to 40 wt. % of one or more elastomers (e) other than component f;*

*f) from 0 to 40 wt. % of one or more optionally rubber-modified vinyl (co)polymers (f); and*

*g) from 0 to 10 wt. % one or more further additives;*

[the process comprising using a masterbatch,] wherein the *melt-mixed coloured polycarbonate composition comprises a* masterbatch [consists] *consisting* of *the* at least one pigment (*b*) and *the* at least one demoulding agent (*c*) in compounding *prepared using a shear and mixing unit in a single-shaft extruder, a multi-shaft extruder, an internal mixer, a co-kneader, or a shear roller device*,

[wherein the demoulding agent is at least one selected from the group consisting of pentaerythritol tetrastearate, glycerol monostearate and stearyl stearate,]

wherein the *at least one* pigment [is] (*b*) *comprises* a carbon-based pigment and the content of pigment in the masterbatch is from 40 to 60 wt. %, based on the total weight of the masterbatch, wherein the carbon-based pigment is selected from the group consisting of: a) carbon black; b) graphite; c) fullerene; d) graphene; e) activated charcoal; and f) carbon nanotubes, *and*

[wherein the process additionally comprises preparing the masterbatch by using a shear and mixing unit in a single-shaft extruder, multi-shaft extruder, internal mixer, co-kneader or a shear roller device,]

wherein the pigment is homogeneously distributed and present in finely dispersed form in the polymer composition[, wherein the produced coloured polymer composition is a polycarbonate composition comprising a) from 40 to 99.96 wt. % of at least one thermoplastic polymer (a), wherein polymer (a) is at least one selected from the group consisting of aromatic polycarbonates and aromatic polyester carbonates, wherein the polymer has a weight average molecular weight of 15,000 to 80,000 g/mol and is a homopolycarbonate or copolycarbonate containing bisphenol A b) from 0.1 to 3 wt. % of at least one pigment component (b), c) from 0.1 to 3 wt. % of at least one demoulding agent (c) selected from the group consisting of pentaerythritol tetrastearate, glycerol monostearate and stearyl stearate, d) from 0 to 60 wt. % of one or more thermoplastic polyesters (d), e) from 0 to 40 wt. % of one or more elastomers (e) other than component f, f) from 0 to 40 wt. % of one or more optionally rubber-modified vinyl (co)polymers (f), and g) from 0 to 10 wt. % one or more further additives].

2. An injection molded article according to claim 1, wherein the pigment is carbon black.

3. An injection molded article according to claim 1, wherein the *masterbatch is prepared by a* process [comprises] *comprising*:

a) metering said demoulding agent and said pigment into said shear and mixing unit, b) melt-mixing the pigment in the demoulding agent and thereby dispersing the pigment in the demoulding agent to form a melt mixture, c) optionally filtering the melt mixture, d) forming melt strands, e) cooling and granulating the melt strands, and f) when using underwater or water-ring granulation in step e), drying granules.

4. The injection molded article according to claim 3, wherein the granulating is carried out by underwater granulation or hot-face water-ring granulation.

5. An injection molded article according to claim 1 wherein said pigment is not in powder form.

6. An injection molded article according to claim 1 wherein said pigment is in the form of a pigment concentrate.

7. An injection molded article according to claim 1, wherein said masterbatch comprises a concentrate of carbon black in said demoulding agent and said demoulding agent is pentaerythritol tetrastearate.

8. The injection molded article according to claim 1, wherein the coloured [polymer composition is a] polycarbonate composition [comprising] *comprises:* a) from 50 to 75 wt. % of at least one thermoplastic polymer (a), b) from 0.1 to 1.5 wt. % of at least one pigment component (b), c) from 0.1 to 1.5 wt. % of at least one demoulding agent (c), d) from 20 to 60 wt. % of one or more thermoplastic polyesters (d), e) from 2 to 20 wt. % of one or more elastomers (e) other than component f, f) from 3 to 40 wt. % of one or more optionally rubber-modified vinyl (co)polymers (f), and g) from 0.2 to 10 wt. % one or more further additives.

9. The injection molded article according to claim 8, wherein the demoulding agent is pentaerythritol tetrastearate.

10. An injection molded article according to claim 1, wherein the demoulding agent is pentaerythitol tetrastearate.

11. An injection molded article according to claim 1, wherein the masterbatch [is used in the form of] *comprises* granules or pellets of 1 to 5 mm in length.

12. An injection molded article according to claim 1, wherein the masterbatch [is used in the form of] *comprises* powder having a diameter of 0.1 to 0.5 mm.

13. An injection molded article according to claim 1, wherein the pigment [is used] in [the preparation of] the coloured polymer composition *is provided* solely in the form of the masterbatch consisting of pigment and demoulding agent.

* * * * *